US010515141B2

(12) United States Patent
Style

(10) Patent No.: US 10,515,141 B2
(45) Date of Patent: Dec. 24, 2019

(54) SYSTEMS AND/OR METHODS FOR DELAYED ENCODING OF XML INFORMATION SETS

(71) Applicant: Software AG USA, Inc., Reston, VA (US)

(72) Inventor: Bernard J. Style, Centreville, VA (US)

(73) Assignee: Software AG USA, Inc., Reston, VA (US)

( * ) Notice: Subject to any disclaimer, the term of this patent is extended or adjusted under 35 U.S.C. 154(b) by 301 days.

(21) Appl. No.: 14/109,118

(22) Filed: Dec. 17, 2013

(65) Prior Publication Data

US 2014/0101538 A1 Apr. 10, 2014

Related U.S. Application Data

(63) Continuation-in-part of application No. 13/551,891, filed on Jul. 18, 2012.

(51) Int. Cl.
G06F 17/22 (2006.01)
(52) U.S. Cl.
CPC .......... *G06F 17/2247* (2013.01); *G06F 17/22* (2013.01); *G06F 17/2252* (2013.01)
(58) Field of Classification Search
CPC ... G06F 17/22; G06F 17/2247; G06F 17/2252
USPC ................................................ 715/234, 242
See application file for complete search history.

(56) References Cited

U.S. PATENT DOCUMENTS

| 5,339,406 A | * | 8/1994 | Carney | ............... G06F 11/0778 714/45 |
| 5,689,711 A | | 11/1997 | Bardasz | |
| 5,812,794 A | * | 9/1998 | Heindel | ............... G06F 9/4428 709/206 |
| 5,963,975 A | * | 10/1999 | Boyle | ................. G06F 12/0817 711/117 |

(Continued)

OTHER PUBLICATIONS

Jimmy Zhang; Non-Extractive Parsing for XML; May 19, 2004; XML.com; pp. 1-5.*

(Continued)

*Primary Examiner* — Andrew R Dyer
(74) *Attorney, Agent, or Firm* — Nixon & Vanderhye P.C.

(57) ABSTRACT

Certain example embodiments described herein relate to techniques for processing XML documents of potentially very large sizes. For instance, certain example embodiments parse a potentially large XML document, store the parsed data and some associated metadata in multiple independent blocks or partitions, and instantiate only the particular object model object requested by a program. By including logical references rather than physical memory addresses in such pre-parsed partitions, certain example embodiments make it possible to move the partitions through a caching storage hierarchy without necessarily having to adjust or encode memory references, thereby advantageously enabling dynamic usage of the created partitions and making it possible to cache an arbitrarily large document while consuming a limited amount of program memory. Additionally, certain example embodiments relate to, in addition to delaying the instantiation of nodes, delaying the encoding of respective segments of the XML document until associated nodes are referenced.

15 Claims, 13 Drawing Sheets

(56) References Cited

U.S. PATENT DOCUMENTS

| | | | | |
|---|---|---|---|---|
| 6,031,995 | A | * | 2/2000 | George ............ G06F 17/30958 707/E17.011 |
| 6,219,666 | B1 | | 4/2001 | Krishnaswamy |
| 6,343,339 | B1 | | 1/2002 | Daynes |
| 6,542,911 | B2 | | 4/2003 | Chakraborty et al. |
| 6,654,855 | B1 | * | 11/2003 | Bopardikar ........... G06F 12/121 711/118 |
| 6,856,993 | B1 | | 2/2005 | Verma |
| 7,092,967 | B1 | | 8/2006 | Pannala et al. |
| 7,191,186 | B1 | | 3/2007 | Pullen |
| 7,210,097 | B1 | | 4/2007 | Clarke et al. |
| 7,275,069 | B2 | * | 9/2007 | Hundley ................. G06F 8/425 707/737 |
| 7,366,732 | B2 | | 4/2008 | Creeth |
| 7,373,362 | B2 | | 5/2008 | Detweiler |
| 7,454,436 | B2 | | 11/2008 | Miejer et al. |
| 7,483,915 | B2 | | 1/2009 | Thompson |
| 7,512,592 | B2 | * | 3/2009 | Lemoine ........... G06F 17/30371 |
| 7,600,182 | B2 | * | 10/2009 | Carr ....................... G06F 17/243 715/222 |
| 7,680,875 | B1 | * | 3/2010 | Shopiro ............ G06F 17/30893 709/200 |
| 7,730,467 | B1 | * | 6/2010 | Hejlsberg ............ G06F 17/2247 717/142 |
| 7,761,459 | B1 | | 7/2010 | Zhang et al. |
| 7,809,888 | B1 | | 10/2010 | Clark et al. |
| 7,933,928 | B2 | * | 4/2011 | Chandrasekar ... G06F 17/30908 707/802 |
| 8,131,728 | B2 | | 3/2012 | Kingsbury et al. |
| 8,397,158 | B1 | * | 3/2013 | Nethi .................. G06F 17/2247 715/234 |
| 8,832,674 | B2 | | 9/2014 | Harris et al. |
| 2002/0083078 | A1 | | 6/2002 | Pardon |
| 2002/0147721 | A1 | * | 10/2002 | Gupta ................. G06F 16/9027 |
| 2002/0157105 | A1 | | 10/2002 | Vienneau et al. |
| 2003/0069902 | A1 | | 4/2003 | Narang |
| 2003/0200348 | A1 | * | 10/2003 | Humphries ............... G06F 8/73 719/310 |
| 2004/0073758 | A1 | * | 4/2004 | Blumrich .................. G06F 9/52 711/151 |
| 2004/0254905 | A1 | * | 12/2004 | Tiku ...................... G06F 16/957 706/55 |
| 2005/0044197 | A1 | | 2/2005 | Lai |
| 2005/0203957 | A1 | | 9/2005 | Wang et al. |
| 2006/0048097 | A1 | | 3/2006 | Doshi |
| 2006/0106837 | A1 | * | 5/2006 | Choi .................. G06F 17/2247 |
| 2006/0236224 | A1 | * | 10/2006 | Kuznetsov ............ G06F 17/227 715/235 |
| 2006/0277170 | A1 | * | 12/2006 | Watry ............... G06F 17/30932 |
| 2006/0288214 | A1 | | 12/2006 | Dutta |
| 2007/0005622 | A1 | | 1/2007 | Fernandes et al. |
| 2007/0260608 | A1 | | 11/2007 | Hertzberg |
| 2007/0288840 | A1 | | 12/2007 | Girle et al. |
| 2008/0215517 | A1 | * | 9/2008 | Johnson ................. G06Q 10/10 706/47 |
| 2009/0031310 | A1 | | 1/2009 | Lev |
| 2009/0089658 | A1 | | 4/2009 | Chiu et al. |
| 2009/0276431 | A1 | | 11/2009 | Lind |
| 2011/0167416 | A1 | | 7/2011 | Sager |
| 2011/0264861 | A1 | | 10/2011 | Fee |
| 2012/0222005 | A1 | | 8/2012 | Harris et al. |
| 2013/0139146 | A1 | * | 5/2013 | Bickle ............... G06F 17/30914 717/174 |
| 2013/0198605 | A1 | | 8/2013 | Nicola |
| 2014/0026027 | A1 | | 1/2014 | Style |
| 2014/0108917 | A1 | | 4/2014 | Style |

OTHER PUBLICATIONS

Mike; Operating Systems Development—Physical Memory; 2008; BrokenThorn Entertainment; pp. 1-12.*
"Atomic," Apr. 3, 2000; Free On-Line Dictionary of Computing: pp. 1-2.*
XML Parser; Jul. 22, 2010; W3CSchools.com; pp. 1-2.
Instantiation; Jun. 20, 2010; Free On-line Dictionary of Computing; p. 1.
Steve Muench, "Building Oracle XML Applications," Oct. 2, 2000, pp. 1-883.
Wikipedia—Offset (Computer Science), 1 page. http://en.wikipedia.org/wiki/Offset (computer_science).
XimpleWare, VTD-XML Introduction and API Overview, Feb. 2008, pp. 1-44. http://www.ximpleware.com/vtd-xml_intro.pdf.
Shah et al., "A Data Parallel Algorithm for XML DOM Parsing", Proceedings of Database and XML Technologies, 6th International XML Database Symposium, 2009, Lyon, France, Aug. 24, 2009, pp. 75-90. http://www.cs.arizona.edu/~bkmoon/papers/xsym09.pdf.
The Apache Xerces Project, retrieved Jul. 18, 2012, 4 pages. http://xerces.apache.org/.
Moravan et al.; Supporting Nested Transaction Memory in LogTM; Oct. 21-25, 2006; Architectural Support for Programming Languages and Operating Systems 06; Association for Computing Machinery; pp. 359-370.
Berenson et al.; A Critique of ANSI SQL Isolation Levels; 1995; Special Interest Group on Management of Data 95; Association for Computing Machinery; pp. 1-10.
Collard et al.; Factoring Differences for Iterative Change Management; 2006; Proceedings of the Sixth IEEE International Workshop on Source Code Analysis and Manipulation (SCAM'06); Institute of Electrical and Electronics Engineers; pp. 1-10.
"Partition"—Microsoft Computer Dictionary, May 1, 2002, Microsoft Press, 5$^{th}$ Edition, p. 494.
"Bind;" Microsoft Computer Dictionary; May 1, 2002; Fifth Edition; p. 73.
"Cache;" Jun. 7, 2012; Techterms.com; pp. 1-2.
"Encode;" American Heritage Dictionary; 2002; Houghton Mifflin Company; 4th Edition; p. 461.
Data Structures and Other Objects Using C++; Addison Wesley Longman; 1997; p. 179.
"Namespace;" Free On-line Dictionary of Computing; Dec. 9, 2008; pp. 1-2.
Wikepedia—Metadata, http://en.wikipedia.org/w/index.php?title=Metadata&oldid, retrieved Aug. 16, 2016, 12 pages.
Wikepedia—Persistence (Computer Science), http://en.wikipedia.org/w/index.php?title=Persistence_(computer_science), retrieved Jun. 22, 2015, 4 pages.
Wikepedia—Paging, https://en.wikipedia.org/w/index.php?title=Paging&oldid. retrieved Jun. 22, 2015, 11 pages.
Wikepedia—Computer Data Storage, https://en.wikipedia.org/w/index.php?title=Computer_data_storage, retrieved Jun. 22, 2015, 11 pages.
Wikepedia—Don't Repeat Yourself, https://en.wikipedia.org/w/index.php?title=Don't_repeat_yourself, retrieved Jun. 25, 2015, 2 pages.
Wikepedia—Garbage Collection (Computer Science) https://en.wikipedia.org/w/index.php?title=Garbage_collection_(computer_science), retrieved Jun. 22, 2015, 14 pages.
Wikepedia—Write Amplification, https://en.wikipedia.org/w/index.php?title=Write_amplification, retrieved Jun. 22, 2015, 11 pages.
Oracle Text Search "faulty brakes", retrieved Oct. 4, 2016, 22 pages.
Oracle Data Types, Oracle Call Interface Programmer's Guide, Chapter 3, retrieved Oct. 4, 2016, 3 pages.

* cited by examiner

SYSTEMS AND/OR METHODS FOR DELAYED ENCODING OF XML INFORMATION SETS

CROSS-REFERENCE TO RELATED APPLICATIONS

This application is a continuation-in-part (CIP) of U.S. patent application Ser. No. 13/551,891, filed on Jul. 18, 2012, the entire contents of which are hereby incorporated by reference herein.

TECHNICAL FIELD

Certain example embodiments described herein relate to techniques for processing XML documents of varying sizes. More particularly, certain example embodiments relate to techniques that parse a potentially large XML document, store the parsed data and some associated metadata in multiple independent blocks or partitions, and instantiate only the particular object model object requested by a program. Additionally, certain example embodiments relate to, in addition to delaying the instantiation of nodes, delaying the encoding of respective segments of the XML document until associated nodes are referenced.

BACKGROUND AND SUMMARY OF EXAMPLE EMBODIMENTS OF THE INVENTION

XML is a known document encoding standard that facilitates the exchange of information between computer systems. Among other things, XML prescribes a standard way of encoding named hierarchical information.

XML documents can be processed in many ways. However, one common processing technique involves extracting XML documents' information content and creating a memory-resident representation of that information. One commonly used model is the DOM or the Document Object Model, which is governed by a W3C® standard. Each component in an XML document is represented by a discrete DOM object.

One drawback of typical DOM implementations is that the entire object model must reside in memory. Although this approach works well for smaller XML documents (e.g., that can be loaded in memory or a reasonably sized virtual memory), handling very large documents in this way can become cumbersome. For instance, loading large documents may result in high virtual memory demand and poor system performance. This approach also effectively places an upper limit on the size of any XML document that can be processed that depends, for example, on the amount of available memory (real and/or virtual). Additionally, for environments that use dynamic allocation (such as, for example, Java-based environments), this situation results in large numbers of discrete heap-resident objects, which can potentially adversely affect the performance of memory recovery for the objects when they are no longer in use (e.g., through garbage collection). Those skilled in the art know that system performance often degrades sharply when document size becomes unmanageable.

Yet another drawback of the memory-resident approach is that it can be very difficult to share a parsed document in a federated system where processes may not have convenient access to shared memory.

Of course, it would be desirable to implement an approach to XML parsing that performs consistently well under varying circumstances such as, for example, simultaneously processing a small number of very large documents, simultaneously processing a large number of small documents, and/or the like. The need to meet these desires becomes yet more important as the system scales up to an Enterprise-class server sized system.

The inventor has observed that solutions to the XML memory problem tend to fall into one of three categories, namely, adapting the application to an existing DOM model in some pragmatic way, using some model other than DOM, or implementing an improved DOM implementation that improves on prior implementations.

Pragmatic adaptation to DOM oftentimes includes allocating large amounts of memory to the process and simply tolerating poor performance; designing or redesigning the application to limit the size of the document; and/or resorting to some type of ad-hoc partitioning of the documents. Some products currently available by the assignee of the instant application employ the ad-hoc partitioning approach for processing very large documents. For example, the assignee's Integration Server provides an iterating parser that generally makes it possible to maintain a parsing window that typically avoids loading the entire document, subject to certain constraints of course. As another example, the assignee's Trading Networks decomposes large documents into smaller documents in a very specialized approach. It is noted that adapting an application to use ad-hoc partitioning can be very difficult, depending on the size, complexity, processing requirements, and other features of the application and/or environment. Similarly, obtaining maximum performance using ad-hoc partitioning also can be difficult.

Using models other than DOM typically involves a streaming approach in which information is processed during one pass of the document. A streaming push model, such as SAX, can be very efficient from a performance point of view. Unfortunately, however, such models oftentimes are difficult to program. A streaming pull model, such as the AXIOM (TRADEMARK) model used by Axis, is easier to use in many situations, but still does not lend itself well to situations that require non-document-order processing. If it is not possible to process data in document-order, the user generally must enable AXIOM (TRADEMARK) caching, which stores processed data in a cache so that it may be subsequently reused. This cache, however, is a memory-resident pool of objects and, as a result, its behavior can still degrade into the DOM-like pattern, depending on the usage pattern. The current Integration Server product requires that the entire model be memory resident in order to convert the XML document into an Integration Server Document, so the streaming approach does not improve native Document processing as greatly as is desirable.

Another non-DOM implementation is Ximpleware's VTD-XML. See, for example, U.S. Pat. No. 7,761,459, the entire contents of which are hereby incorporated herein by reference. This implementation is believed to completely avoid the creation of DOM objects. It instead uses a location cache (e.g., a Binary File Mask or BFM) to maintain information about the document that resides somewhere else in memory or on disk. The VTP API apparently allows a program to access the document contents from a combination of information in the BFM and the original document without requiring object instantiation. Ximpleware claims that this approach significantly improves performance. Yet there are drawbacks associated with this approach. For example, many third-party products are designed to work with the DOM API. Without the DOM API, this approach is a programming island, requiring custom programming for each application. Moreover, although the '459 patent provides for updates (e.g., adding new components) by allocating empty records in the Binary File Mask, there is no description is provided for the circumstances under which the empty records become filled, or how performance might be affected by a large number of insertions into the original document.

Other non-DOM approaches include customized applications that do not directly utilize DOM. For example, U.S. Pat. No. 8,131,728 (apparently assigned to IBM®), which is hereby incorporated herein by reference in its entirety, describes a technique for extracting the structural information from an XML document and encoding the structural information as a memory-resident index with indexes into the original source data document. The application, a high-speed utility for loading and unloading a Configuration Management Database, processes the smaller memory-resident index rather than the larger source document. Unfortunately, however, the '728 patent (e.g., at col. 5, lines 7-23) suggests that the index is memory-resident, which effectively limits the ultimate size of the document that can be processed, and/or the number of documents that can be processed concurrently due to the total memory occupied by the index.

Other attempts have been made in the pursuit of an improved DOM implementation. The Apache foundation's Xerces (TRADEMARK) DOM parser, for example, is widely used throughout the industry. This product makes use of deferred object instantiation, but unfortunately does not provide a caching mechanism to facilitate processing of documents whose memory model exceeds the amount of available memory.

It is believed that neither Xerces (TRADEMARK) nor AXIOM (TRADEMARK) provides the ability to process arbitrarily large documents in a random fashion. And while Ximpleware VDT-XML can process arbitrarily large documents, it does so using a non-standard (e.g., non-DOM) API.

None of these approaches explicitly describe a systematic technique for limiting the total memory allocation for the Document processing within a system. More generally, there do not seem to be any apparent facilities for systematic tuning of system performance.

In addition to the above-identified issues with the conventional approaches discussed above, it is believed that none of these approaches addresses the issue of sharing a large parsed document if a session migrates across processor sessions. Furthermore, it is believed that none of these approaches addresses the issues of scalability and predictability for Enterprise-class and/or other large scale servers. There is no express explanation in the above-identified approaches tending to show that shared and/or distributed processing can be accommodated.

Thus, it will be appreciated by those skilled in the art that there is need for improved techniques for processing large XML documents, e.g., in ways that overcome the above-described and/or other problems.

In certain example embodiments, a system for processing XML documents is provided. Processing resources include at least one processor, a memory, and a non-transitory computer readable storage medium. The processing resources are configured to: parse an XML document into one or more constituent nodes, with the XML document including a plurality of objects representable in accordance with an object model, and with the XML document being parsed without also instantiating the objects therein; store the parsed constituent nodes and associated metadata in one or more partitions; and in response to requests for objects from the XML document from a user program, instantiate only said requested objects from their associated partition(s) in accordance with the object model.

In certain example embodiments, a method of processing large documents is provided. In connection with at least one processor, a large document is parsed into one or more constituent nodes, with the document including a plurality of objects representable in accordance with an object model, and with the document being parsed without also instantiating the objects therein. The parsed constituent nodes and associated metadata are stored in one or more cacheable partitions, with the cacheable partitions being located in a memory and/or a non-transitory backing store. A request from a user program for an object from the document is handled by: identifying the partition(s) in which nodes corresponding to the requested object is/are located, and instantiating only said requested objects from the identified partition(s) in accordance with the object model. The cacheable partitions are structured to include only logical references among and between different nodes.

In certain example embodiments, there is provided a non-transitory computer readable storage medium tangibly storing instructions that, when executed by at least one processor of a system, perform a method as described herein.

According to certain example embodiments, each said cacheable partition may include a locator array, a properties array, and a character array. The locator array may be configured to identify starting positions of nodes encoded in the properties array. The properties array may be configured to store encoded nodes, as well as, for each said encoded node: metadata including a respective node type, reference(s) to any familial nodes thereof, and offset(s) into the character array for any attribute and/or text value(s) associated therewith.

According to certain example embodiments, the XML document may be parsed by executing a pre-parsing initialization process that includes: creating a cacheable document node that corresponds to the starting point for user program access to the XML document; allocating a name dictionary that includes an indexed entry for each unique XML tag name included in the XML document; allocating a namespace dictionary that includes an index entry for each unique XML namespace included in the XML document; and allocating a partition table that includes a list of cacheable partitions and an allocation array that allows a node's allocation identifier to be resolved to a specific cacheable partition, each said cacheable partition including metadata from the pre-parsing initialization process.

According to certain example embodiments, the parsing may include: recognizing parsing events of predefined parsing event types within the XML document; creating nodes for the recognized parsing events; adding the created nodes to a current partition while there is sufficient space therein; and creating a new partition when there is insufficient space in the current partition for adding created nodes, updating the partition table, and continuing with the adding by treating the newly created partition as the current partition.

A feature of certain example embodiments is that the partitions may be movable from the memory to the non-transitory computer readable storage medium when memory usage reaches or exceeds a threshold.

Another feature of certain example embodiments is that the partitions may be movable through a caching storage hierarchy of the processing resources without adjusting or encoding memory references therein.

Another feature of certain example embodiments is that objects instantiated from the partitions, when resident in the memory, may be free from references to other objects in their own respective partitions and any other partitions.

Still another feature of certain example embodiments is that partitions for the parsed document may be removed from the memory and/or the non-transitory computer readable storage medium when the user program no longer includes any references to the document or any objects thereof.

Still another feature of certain example embodiments is that the partitions may include only logical references among and between different nodes.

Yet other example features and example embodiments are directed to delaying, in addition to node instantiation, the encoding of respective segments of the input XML document until associated nodes are referenced.

These aspects, features, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
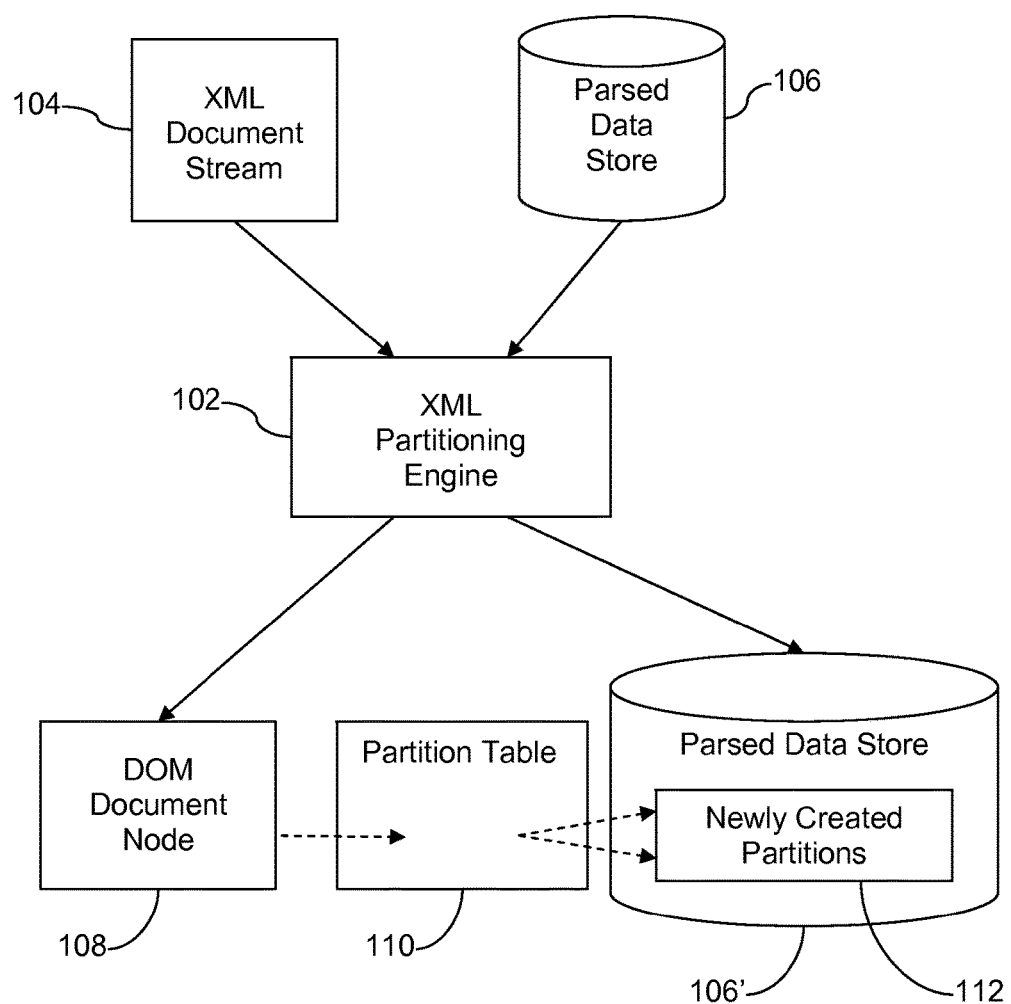
FIG. 1 is a schematic view that demonstrates user program creation of cached XML documents in accordance with certain example embodiments.

Certain example embodiments relate to DOM implementations that improve large XML documents processing. The techniques of certain example embodiments do not create the entire object model. Instead, they may completely parse the XML document, storing the parsed data and some metadata in multiple independent blocks, hereafter referred to as partitions. The techniques of certain example embodiments may, in addition or in the alternative, instantiate (e.g., create) only the particular DOM object requested by a program. Employing these techniques alone and/or in combination advantageously reduces the number of memory-resident structures needed to represent an XML document, thereby making it possible to efficiently process very large documents without consuming large amounts of memory.

It will be appreciated, then, that certain example embodiments involve the pre-parsing of an XML document into independent partitions that include the parsed data for the XML document, without necessarily creating the associated DOM objects. Theses partitions may include logical references rather than physical memory addresses in certain example embodiments, and the partitions can be moved through a caching storage hierarchy without necessarily having to adjust or encode memory references. This design approach advantageously enables dynamic usage of the created partitions. Unlike many conventional approaches, the partitions of certain example embodiments are not necessarily bound to a static memory address, a database temporary table, or even a particular process. This makes it possible to cache an arbitrarily large document while consuming a limited amount of program memory. Additionally, the DOM objects instantiated from any of the partitions, when memory-resident, may lack all references to objects in its own or any other partitions, thereby making each partition independent even when memory-resident. As a consequence, operating environments that use a dynamic heap (such as, for example, Java-based environments) automatically gain the additional benefit of automatic memory reclamation for partitions that are not in use (e.g., referenced). Because it is possible to share a disk-backed cache (such as, for example, Terracotta's BIGMEMORY® utilizing the Terracotta Server Array), it becomes possible to access a parsed document from a programming session that migrates between computer systems (e.g., that have a shared disk cache).

Certain example embodiments are advantageous in the sense that the object model becomes naturally updatable. The parsed data allocation scheme of certain example embodiments does not require that logically adjacent content be physically adjacent in a partition. For instance, a newly allocated node (as well as text and/or attribute values) can be physically added the end of the last cacheable partition. References from pre-existing nodes in other partitions to the newly created node may be established using the allocation identifier of the newly encoded node.

The systematic throttling of memory consumption advantageously leads to stable and predictable system operation when processing large documents or large numbers of documents.

Certain example embodiments involve an XML partitioning engine, a parsed data store, and a DOM instantiator. The XML partitioning engine may be implemented as a program that reads an XML document stream and converts it into a series of encoded nodes in cacheable partitions that contain no memory references (e.g., addresses). The parsed data store may be implemented as a program and/or repository that stores and retrieves the cacheable partitions outside of the user program's memory space (for example, in Java, outside of the memory heap). The DOM instantiator may be implemented as a program that creates DOM objects on demand. It may accomplish this by retrieving the appropriate cacheable partition from a local partition pool or the parsed data store, and creating the DOM object. For example, in Java, it may construct an appropriate W3C® DOM node. Further details of these example components will be provided below in connection with an example implementation.

FIG. 1 is a schematic view that demonstrates user program creation of cached XML documents in accordance with certain example embodiments. The user program may initiate document creation by invoking the XML partitioning engine 102, e.g., with the source document XML stream 104 and a parsed data store implementation 106 as inputs. The XML document stream 104 may be thought of as the stream of characters comprising the XML document. The parsed data store 106, on the other hand, may provide the mechanism for storing the encoded document outside of the program's memory space.

The XML partitioning engine 102 may return a standard W3C® DOM document node implementation that includes all of the information needed to construct DOM objects 108 from the parsed document. The user program may employ standard DOM methods to navigate the parsed document. Each navigation request may retrieve associated backing information, e.g., from the parsed data store 106 or the local partition pool, and instantiate (e.g., create) the requested object. As will be explained in greater detail below, a partition table 110 may include a list of cacheable partitions. The newly created partitions 112 may be stored in the now-updated parsed data store 106'.

When the user program no longer includes any references to the document node or any nodes related to it, the backing cacheable partitions for the parsed document may be removed from the parsed data store 106. For example, in Java, the finalizer method may be invoked on the documents when there are no references to the document and, thus, the backing partitions can be removed from the parsed data store 106.

Figure 2:
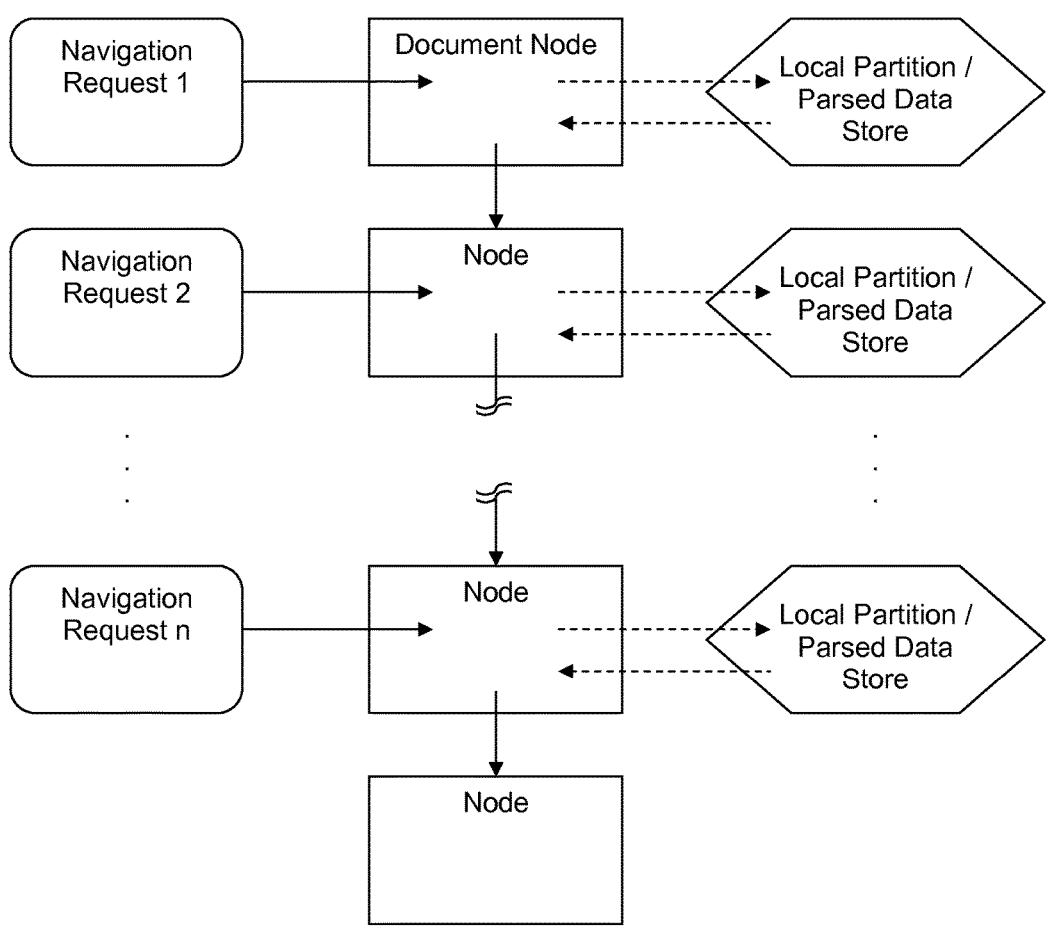
FIG. 2 demonstrates user navigation of a cached document, in accordance with certain example embodiments.

FIG. 2 demonstrates user navigation of a cached document, in accordance with certain example embodiments. As can be seen, navigation requests are processed and used to retrieve nodes from local partition(s) and/or the parsed data store, and from a programmer's point of view, externally, the document does not "look" any different from a typical DOM structure. However, there are differences internally, e.g., in the structure of the document and how the tree structure is managed as set forth in greater detail below. The final node in the chain may be used to convey an "end of program" or "end of processing" message back to the user. In some cases (for example in some garbage-collected runtimes such as Java-based environments), such an explicit "end" message may not necessary, as a garbage collector may simply operate on the structure automatically. For example, in some cases, the Java implementation may receive a call-back, indicating that the buffers in the parsed document store are no longer in use.

Figure 3:
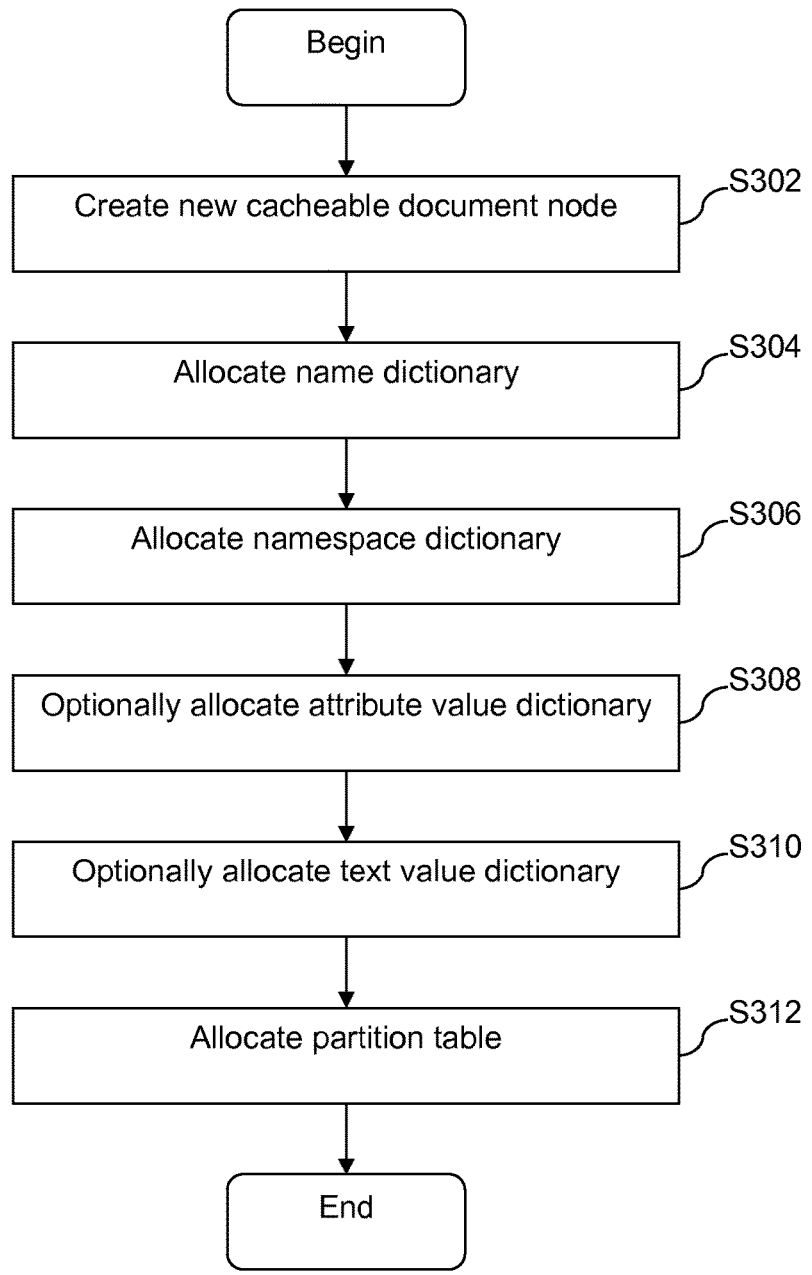
FIG. 3 is a flowchart showing an example initialization process for the partitioning process, in accordance with certain example embodiments.

As indicated above, the XML partitioning engine is configured to receive an XML input stream and/or a parsed data store entry as input. It may, as output, produce encoded XML fragments (that may be stored in the parsed data store) and a DOM cacheable document node (e.g., for program's memory space). FIG. 3 is a flowchart showing an example initialization process for the partitioning process, in accordance with certain example embodiments. A new cacheable document node is created in step S302, which may be, for example, a W3C® Document Node that serves as the starting point for user program access. A name dictionary is allocated in step S304, with the name dictionary including one entry for each unique XML tag name that appears in the document. The dictionary may be structured as a sequential list, and items in the dictionary may be referenced by an integer or other index. This structure can in some instances result in considerable memory savings for large document, e.g., when there are many occurrence of a given tag name, and especially when the names are long. The name dictionary may be empty initially and may be implemented in fashion to expedite the test for uniqueness. For example, a binary search or hash table may be used. A namespace dictionary is allocated in step S306. The Namespace Dictionary may include one entry for each unique XML namespace that appears in the document and, similar to the above, the namespace dictionary may be implemented as a sequential list, with items in the dictionary being referenced by an integer or other index. Initially, the namespace dictionary may be empty. The namespace dictionary may be implemented in fashion to expedite the test for uniqueness, and binary searching or hash tables may be used to facilitate this behavior in certain example embodiments.

Optionally, an attribute value dictionary may be allocated in step S308. When it is used, unique occurrences of attribute values may be saved to this location, potentially reducing memory usage. Its implementation may be similar to the names and namespaces dictionaries. In addition, or in the alternative, a text value dictionary optionally may be allocated in step S310. When it is used, unique occurrences of text values may be saved here, potentially reducing memory usage. Its implementation may be similar to the names and namespace dictionaries.

A partition table allocated is in step S312. As alluded to above, the partition table may include a list of cacheable partitions, wherein each cacheable partition includes the information from the pre-parsed XML document. Initially, the partition table is empty. It may include, for example, an allocation array that records the allocation identifier of the last encoded node in a partition. This may make it is possible to determine which cacheable partition includes a given node without retrieving the partition if it has been archived to the parsed data store.

Figure 4:
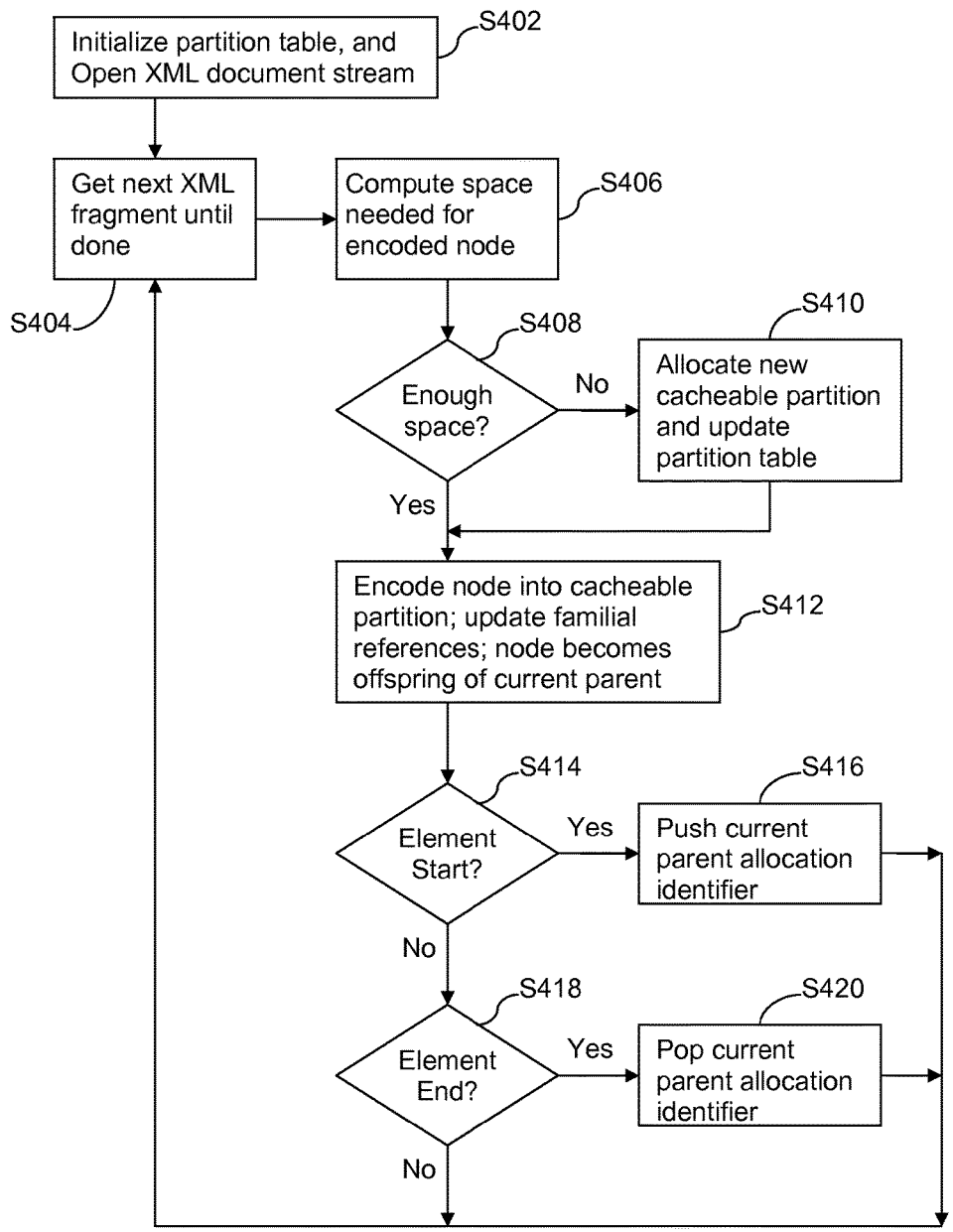
FIG. 4 is a flowchart showing an example partition process in accordance with certain example embodiments.

FIG. 4 is a flowchart showing an example partition process in accordance with certain example embodiments. As shown in step S402, the partition table is initialized (e.g., in accordance with the example process described above in connection with FIG. 3), and the XML document stream is opened. The cacheable document node created in step S302 becomes the current parent node and all subsequently encoded nodes are descendent children of the document node. A streaming XML tokenizer processes an XML document fragment, responding to a sequence of XML parsing events such as the start of an XML element, the declaration of an XML namespace, the presence of an XML attribute, the presence of character data, the presence of a comment, etc. Accordingly, as shown in step S404, the next XML fragment is obtained until processing of the document is complete. As the parsing events are recognized, each event is used to move associated parsed data (if the event has associated data) into a cacheable partition. In step S406, the parsing event determines the amount of space that is needed in the current cacheable partition. If there is insufficient space (e.g., as determined in step S408), a new cacheable partition is allocated and added to the partition table (e.g., in step S410).

If there is enough space in the current cacheable partition, or once a new cacheable partition is created and the partition table is updated accordingly, the node is encoded into the appropriate cacheable partition in step S412. In brief, its familial references may be updated, and the new node may become the offspring of the current parent. When a node is encoded into a partition, its position in the property array may be recorded in the locator array so that it is possible to quickly find the position of an encoded node given its allocation identifier. Each partition may have a structure that supports this functionality. For instance, each partition may include a character array where XML text and XML attribute values are copied, a properties array where the various properties of the XML event are encoded and, a locator array that sequentially records the position in the properties array where a node's properties are stored. The properties of the XML event may include information such as, for example, the type of node, the allocation identifiers of its parent, its sibling and first and last child nodes, references to the character array where the event's textual information is stored, etc.

In certain example embodiments, the parsed data for each event type at step S412 may be written as follows. When an element start tag event is processed, the current position in the properties array is recorded in the location array (e.g., so that the start of the element in the properties array can be identified accordingly), and an element code is written to the properties array, along with an integer or other index into the name dictionary. When an element's namespace declaration is processed, an index is written to the properties array, along with a reference to the appropriate namespace dictionary entry. When an attribute is encountered, an index is written to the properties array, along with a reference to the appropriate name dictionary entry. The attribute value may be copied to the character array, and the location of the attribute value in the character array may be copied into the properties array following the attribute name index. When a text event is received, a text code may be written to the properties buffer. The text content may be copied to the character array, and the position in the character array may be saved in the properties array. When a comment event is received, a comment code may be written to the properties array, followed by an index being written into the character array. The comment content may be copied into the Character Array. After the data for an event has been encoded (e.g., in step S412), additional special processing may occur for the element start and element end events. When an element start is processed (e.g., as indicated in step S416), the allocation identifier for the current parent node is saved (e.g., by pushing it onto a LIFO stack). The allocation identifier of the just encoded element becomes the new current parent node. All subsequently allocated nodes become children of the new current parent node. When an element end tag is processed (e.g., as indicated in step S420), the current parent node is restored to its previous value (e.g., by popping it from a LIFO stack). All subsequently allocated nodes become children of the previous parent node. When no more XML fragments are available at step S404, the document has been completely processed.

In certain example embodiments, an optional throttling mechanism may be used to limit the total amount of program storage that is allocated to the local partition pool. This may in some instances make it possible to dampen the effects of an atypically large number of documents arriving during a short interval, while reducing the likelihood of insufficient memory errors.

As alluded to above, when the current cacheable partition becomes full, a new cacheable partition may be allocated. If the local partition pool also is full, the cacheable partition may be archived to the parsed data store. In order to transfer a Cacheable Document intact to a different session, cacheable partitions in the local partition pool may be archived to the parsed data store. Additionally, the partition table itself, which may not normally be archived, may also be committed to the parsed data store. If the archival storage system supports direct access to archived data (e.g., without full serialization and deserialization), it also may be possible to curtail the use of the local partition pool in favor of direct access to the archived data. Thus, there may be no inherent limit on the number and size of partitions, other than the total available program memory, cache, disk storage, etc.

Figure 5:
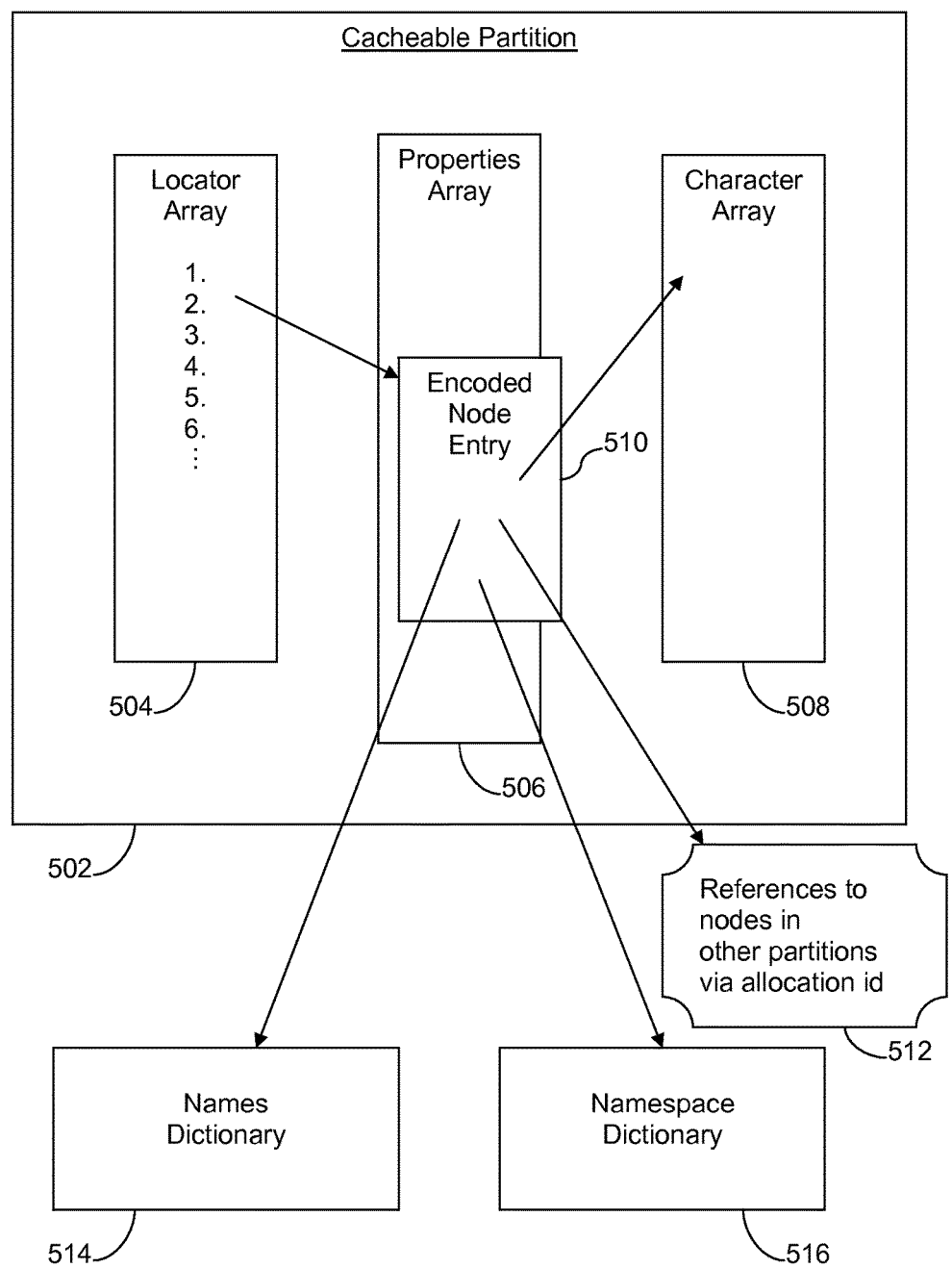
FIG. 5 schematically shows the contents of an example cacheable partition created by a partitioning engine in accordance with certain example embodiments.

FIG. 5 schematically shows the contents of an example cacheable partition created by a partitioning engine in accordance with certain example embodiments and, thus, shows an example encoding for the nodes. The cacheable partition 502 shown in FIG. 5 includes a locator array 504, a properties array 506, and a character array 508. The inclusion of the locator array 504 indicates that certain example embodiments involve locator information being stored in each partition (e.g., as opposed to retaining a single completely memory-resident index). Plural encoded node entries may be present in the properties array 506. The example encoded node entry 510 shown in FIG. 5 may include a variety of data and/or linkages to data. For example, nodes may have an entry for DOM node type. Additionally, there may be references 512 (allocation identifiers) for parent, previous sibling, and next sibling.

Text nodes may have an offset into the character array. If a dictionary is used for text values, then an offset into the text value dictionary may be used instead of an offset into the character array. Comment nodes and processing instruction nodes may have offsets into the character array 508.

Elements may have an offset into the names dictionary 514 and, if the namespace is qualified, they also may have an offset into the namespace dictionary 516. There also may be a list of entries, e.g., with one entry for each attribute. Each entry may include an offset into the names dictionary 514, an offset into the namespace dictionary 516 (if needed), and an offset into the character array 508 of the partition table. If the optional attribute values dictionary is in use, an offset into the attribute values dictionary may be saved instead of an offset into the character array 508. Additionally, elements may have allocation identifier references to their first and last child nodes.

As indicated above, and as can be appreciated from the description of FIG. 5, certain example embodiments do not retain original documents or references to their contents. In certain example embodiments, there is no encoding for an element end because all familial references may be fully realized as allocation identifiers in the encodings rather than being computed based on context. In other words, familial relationships between nodes may be represented using the allocation identifier uniquely assigned to each node.

Instantiated DOM nodes may reference familial nodes (e.g., parent, sibling, and/or child nodes) using the familial node's allocation identifier. Thus, in certain example embodiments, the XML instantiator may find the referenced node in the appropriate cacheable partition by searching the allocation array. After locating the appropriate cacheable partition, the allocation identifier may be used as an offset into the partition's locator array, e.g., to determine the position of the encoded node information in the properties array. The information may be used to construct a DOM node, and the node may be returned to the requesting program.

Because these DOM nodes may not include any address references to other DOM nodes, the nodes may be eligible for deallocation (or garbage collection) when they are no longer in use. By contrast, in a traditional DOM tree, retaining a reference to any node in the tree retains the entire tree.

The parsed data store may be thought of as at least partly being an off-program-memory bag that is used to archive cacheable partitions. The parsed data store does not occupy storage in the user program's space in certain example embodiments and thus makes it possible for a user program to access an arbitrarily large XML document, in some instances constrained only by the amount of storage accessible to the parsed data store.

Figure 6:
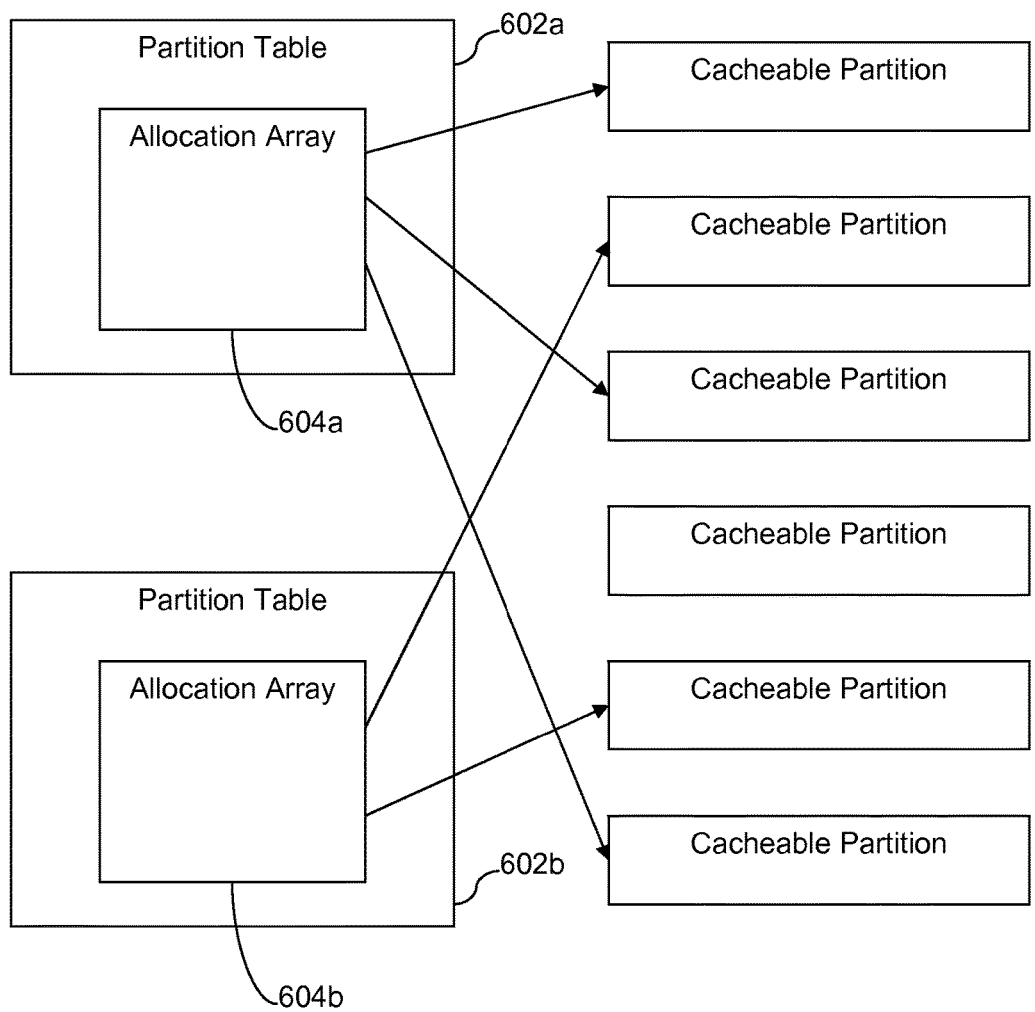
FIG. 6 schematically shows partition tables organizing collections of cacheable partitions for cacheable documents in the parsed data store in accordance with certain example embodiments.

The overall structure of an example parsed data store is shown in FIG. 6. That is, FIG. 6 schematically shows partition tables organizing collections of cacheable partitions for cacheable documents in the parsed data store in accordance with certain example embodiments. In the FIG. 6 example, first and second partition tables 602a-b store respective allocation arrays 604a-b. The allocation arrays 604a-b include references to cacheable partitions, e.g., of the sort described above in connection with FIG. 5. It will be appreciated from the FIG. 6 diagram that partitions from multiple documents can be stored in a single given store, e.g., since there is no connection to one of the cacheable partitions. However, in some example embodiments, it is possible to have a one-to-one relationship as between partition stores and documents.

Certain example embodiments may use Terracotta BIG-MEMORY® caching to store the cacheable partitions in off-heap memory. See, for example, U.S. application Ser. No. 13/354,892, filed on Jan. 20, 2012, for a description of such example techniques. The entire contents of this application are hereby incorporated herein by reference.

When it comes to updating cached documents, certain example embodiments may not include an explicit update mode for cached documents, since cached documents are implicitly updatable via the DOM API. Updating an encoded node simply involves replacing existing references in the encode node with new references. From a user's perspective, instead of being driven by parsing events, the node creation methods in the DOM API may in certain example implementations directly call the node encoding program to append new encodings to the cached partitions. These appended encodings may be physically adjacent to one another, but their logical positions may be anywhere in the document, thereby fully supporting the ability to insert new child nodes and/or remove existing child nodes, at any point in the tree.

In certain example embodiments, by default, text and attribute values may be copied "as is" into each cacheable partition's character array. However, there are situations when there is a great deal of repeated data and, therefore, it may be reasonable to enable these dictionaries in some cases. Thus, as indicated above, text and attribute value dictionaries optionally may be implemented. The added overhead of performing a uniqueness check may be lower than the overhead of copying and caching large amounts of duplicate data, especially when the number of unique alternatives is relatively small.

Certain example embodiments may write partition data directly to the parsed data store bypassing, for example, the local partition pool. This may be advantageous, e.g., if the direct write to the parsed data store is efficient. A Terracotta BIGMEMORY® based implementation of the parsed data store may provide direct partition update functionality in a scalable and efficient manner in certain example embodiments.

In certain example implementations, dedicated partitions may be allocated when the system is initialized, and the parsed data store may retain ownership of the partitions through the system lifecycle. This optional approach (rather than allocating partitions on demand) can help to reduce the likelihood of the heap storage that is intended for use by the parser being scavenged by other non-parsing processes. Such scavenging otherwise may sometimes result in over-utilization of heap storage (e.g., by non-parsing processes) and lead to poor overall system performance.

When local partition throttling is used, the parsed data store may limit the amount (e.g., in terms of total size or number) of storage that is committed to cached partitions throughout the system. When a threshold is exceeded, no new documents may be parsed until total usage by all documents drops below the threshold and/or any attempt to allocate a new cacheable partition causing an existing local partition to be archived to the parsed data store may be at least temporarily halted, e.g., until data is moved to backing storage. Tradeoffs may be considered when tuning a system with a high transaction rate, e.g., so as to reduce the overall system impact. For example, partition size, processing power, I/O time, amount of memory, etc., may be taken into consideration when implementing certain example embodiments.

The various characteristics of the system may be used to tune the behavior of as appropriate for a given installation. Example tuning techniques may include, for example:

Varying the amount of memory allocated for local partitions, which can reduce the impact of peak document arrival at a server (e.g., in terms of number and/or size);

Dedicated memory allocation for the local partitions, which can reduce the likelihood of non-parsing threads over-utilizing heap storage;

Using attribute value dictionaries, which can reduce total memory usage (e.g., local memory and/or cache usage), for instance, when there is a high incidence of repeated attribute values;

Using text value dictionaries, which can reduce total memory usage (both local memory and/or cache usage), for instance, when there is a high incidence of repeated text values; and/or Partition size can be selected. When an environment supports direct access to the cached store, larger buffer sizes may be advantageous. When environments do not support direct access to the cached store, smaller buffer sizes may be advantageous. The use of shared access with an updater may in some instances benefit from smaller partition size.

When the user program no longer contains references to the document node or any of its children nodes, the archived buffers in the parsed data store may be released.

Inter-process sharing of a cacheable document may be facilitated in certain example embodiments through serialization of the dictionaries and parser table used by the document to the shared cache (parsed data store). Because the partition table includes no memory references (e.g., addresses) in certain example embodiments, the serialization can be efficient and direct, thereby improving the practical utility of a shared document (for example, in a cloud computing environment). Multiple concurrent readers may be fully supported in this configuration, even when the processes share no physical program memory.

Supporting multiple concurrent readers and one updater is possible, e.g., if the caching hierarchy provides update notifications to the readers when the cache contents change. A parsed data store embodiment using Terracotta's BIG- MEMORY®, for example, can provide this notification. Change notification may result in the refresh of partitions that have been updated by another process.

Example Embodiments with Delayed Information Set Encoding

The embodiments described above implement delayed node instantiation. Below, other example embodiments are disclosed which, in addition to delayed node instantiation as implemented in the example embodiments described above, implement delayed encoding of information sets (e.g., XML information sets or "infosets"). In the description below, certain example embodiments that include delayed node instantiation and delayed XML information set encoding are referred to as example embodiments with delayed information set encoding and, in this regard, FIGS. 7-12 help illustrate some aspects of certain example embodiments with delayed information set encoding.

Certain example embodiments with delayed information set encoding can help address processor demands of large XML documents. In addition to focusing on exploiting multiple processors (e.g., by parallel parsing of XML documents), they may in some example implementations also make efficient use of memory in a manner similar to that described above with respect to FIGS. 1-6, which illustrate certain example embodiments with delayed node instantiation. In addition to parallel processing, certain example embodiments with delayed information set encoding may also support partial processing of XML documents as a way to improve processor utilization.

Conventional approaches to parallel processing of XML documents, such as the approach described in U.S. Publication No. 2009/0089658 and the approach described in Proceedings of Database and XML Technologies, 6th International XML Database Symposium, 2009, Lyon, France, Aug. 24, 2009, pages 75-90, "A Data Parallel Algorithm for XML DOM Parsing," focus on processor performance without consideration of memory aspects. For example, these conventional approaches create the entire DOM tree in memory. Moreover, these conventional approaches perform a linking phase after the production of the subtrees or fragments in order to resolve references between independently created subtrees or fragments. However, the linking phase may introduce substantial overhead in memory-conserving implementations because, in such implementations, the entire model may not exist and thus additional encoding and decoding steps may be required, or the model may not be fully memory-resident, thus requiring additional fetching and storing.

Certain example embodiments with delayed information set encoding, like the conventional approaches noted above, scan the entire input XML file (e.g., XML document) in order to break the input into segments (e.g., XML data segments) that can each be parsed independently and in parallel to others. However, one way that certain example embodiments with delayed information set encoding disclosed herein differ from conventional parallel processing approaches is that they do not necessarily require a linking phase. Instead, by arranging parsed nodes so that the number of "missing links" to be resolved is reduced, and by efficiently identifying "missing links," it is possible to delay the resolution of "missing links" until the corresponding objects are referenced at runtime. In combination with encoding techniques employed in certain example embodiments with delayed node instantiation discussed above, certain example embodiments with delayed information set encoding retain the ability to delay instantiation of DOM nodes while also enabling the encoding of each partition's information set to proceed in parallel. The ability to defer the resolution of these "missing links" contributes to another advantage of—namely, the ability to defer not only node instantiation as described in relation to the example embodiments described above, but also to defer the encoding of information sets from raw XML as well by caching the raw XML for each XML data segment. When a user program references a node, the segment associated with the referenced node is identified and, thereafter, the raw XML of the identified segment is encoded into a cacheable partition, from which the corresponding object or objects are subsequently instantiated. Such delaying of encoding and instantiation can be of particular benefit in cases where the entire document is not processed. For instance, in such situations, only the pre-parsing overhead of scanning the entire document is incurred without encoding the entire document.

Certain example embodiments with delayed information set encoding divide an XML document into plural XML data segments and encode the information into partitions in a way that reduces and sometimes even eliminates the need to instantiate all the nodes in a DOM tree that corresponds to the document. In certain example embodiments, the only nodes that are instantiated are those that are referenced by a user program, and they may in some cases remain instantiated only for as long as they remain referenced.

The encoding process for certain example embodiments with delayed node instantiation is performed as a serial process with each segment being fully encoded before the next segment is parsed. Moreover, in certain example embodiments with delayed node instantiation, the entire information set is encoded into partitions before any part of the information set is available for program access.

In certain example embodiments with delayed information set encoding, in order to facilitate parallel encoding of partitions, the entire input XML document in pre-parsed with a lightweight pre-parsing process in order to gather a minimal amount of information needed to facilitate parallel encoding of separate segments of the document.

During pre-parsing, the XML document (e.g., entire source document) is divided into segments, and the source for each segment is maintained as a separate entity. Each segment contains the XML source that is needed to encode a corresponding cacheable partition (e.g., a cacheable partition similar to that described above in relation to the example embodiments with delayed node instantiation). Segments may be formed such that they include only complete XML tokens, with there being no split text, comment, or processing instruction (PI) nodes, and element attributes remaining with their owning element. During the creation of the segments, a node identifier (node ID) is computed for each XML node source in the input. This node ID, in certain example embodiments, is the same as the allocation ID described above in relation to the example embodiments with delayed node instantiation. However, no information about the node is required to be retained during this pre-parsing phase. Further, no information set encoding occurs during pre-parsing. The purpose for calculating the node IDs is to determine the highest node ID that is present in the corresponding partition. In certain example embodiments, this is the only use for calculating the node IDs during pre-parsing.

In addition to calculating the node ID, pre-parsing may include forming several information stacks for each segment. For example, a stack of in-scope namespace prefixes (e.g., XML namespace prefixes), a stack of previous peer allocation IDs for each nesting level, and a stack of parent allocation IDs for each nesting level, may be generated for each segment. These stacks are generally small in size and record the processing state of the pre-parser when parsing for each segment begins. Preserving the processing state, or a portion of the processing state as represented by the information stacks, for each segment makes it possible to start a full parsing process for any segment without being dependent upon the processing state of other segments in some cases.

At the completion of the pre-parsing phase, it is known whether the input document is syntactically valid. An optional processing step can determine (e.g., at additional preprocessing cost) if the document is well-formed (e.g., by checking that no duplicate attribute names on a tag, and XML prefixes are properly scoped). If it is known in advance, for example, that a trusted source produces well-formed XML, it may be preferable to avoid this optional step because the pre-parsing phase is a prerequisite to any encoding step and increases the proportion of processing time that cannot be multi-threaded.

By deferring the information set encoding using the example techniques described herein, certain example embodiments with delayed information set encoding may operate the parser in one of two distinct modes. In "reluctant" mode, the parser encodes only those partitions needed to satisfy a request for an encoded partition. This mode is particularly advantageous in situations where it is known in advance that only a portion of a very large document will be processed. In "greedy" mode, the parser allocates as many threads as it is permitted (subject to configuration limits) for the purpose of encoding the full information set as quickly as possible. This mode is particularly advantageous when it is known in advance that significant processing would occur throughout the document tree and elapsed processing time for any single document is important.

Figure 7:
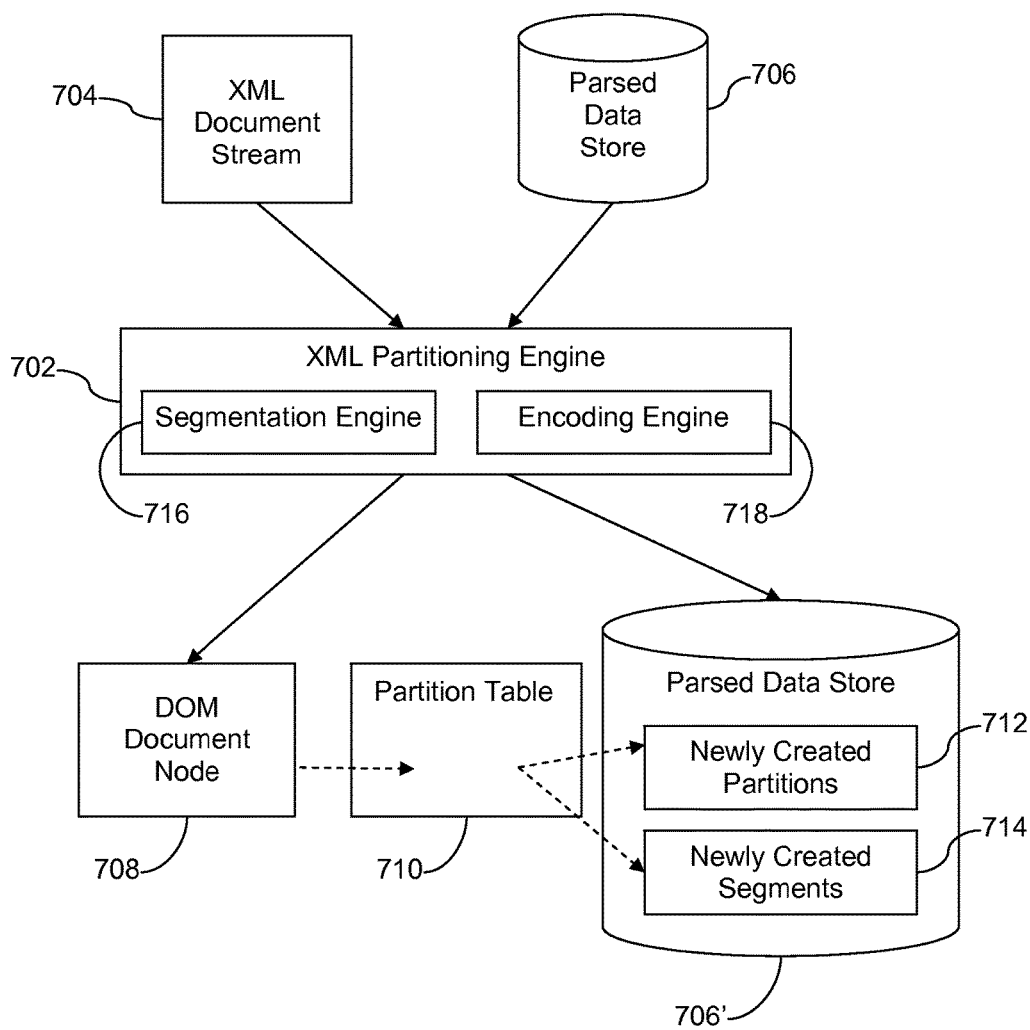
FIG. 7 is another schematic view that demonstrates user program creation of cached XML documents in accordance with certain example embodiments.

A block diagram of a system for delayed information set encoding is illustrated in FIG. 7. When compared with the system shown in FIG. 1 (e.g., an embodiment with delayed node instantiation), FIG. 7 shows, in addition to cacheable partitions 712, the presence of XML segments 714 in the parsed data store 706'.

Also, in contrast to the system described with respect to FIG. 1, in the system of FIG. 7, XML partitioning engine 702 includes two components: an XML segmenting engine 716 and a partition encoding engine 718. The XML segmenting engine 716 and a partition encoding engine 718 may operate to yield a DOM document node implementation that includes the information to construct DOM objects 708 from the parsed document. Additionally, extensions to the parsed data store 706 and 706' and the DOM instantiator (not shown in FIG. 7) are made to accommodate changes with respect to the embodiments with delayed information set encoding.

In the system described above with respect to FIG. 1, the XML partitioning engine reads an input XML document stream and converts it into a series of encoded nodes that are stored in cacheable partitions and that contain no memory references (addresses).

Figure 10A:
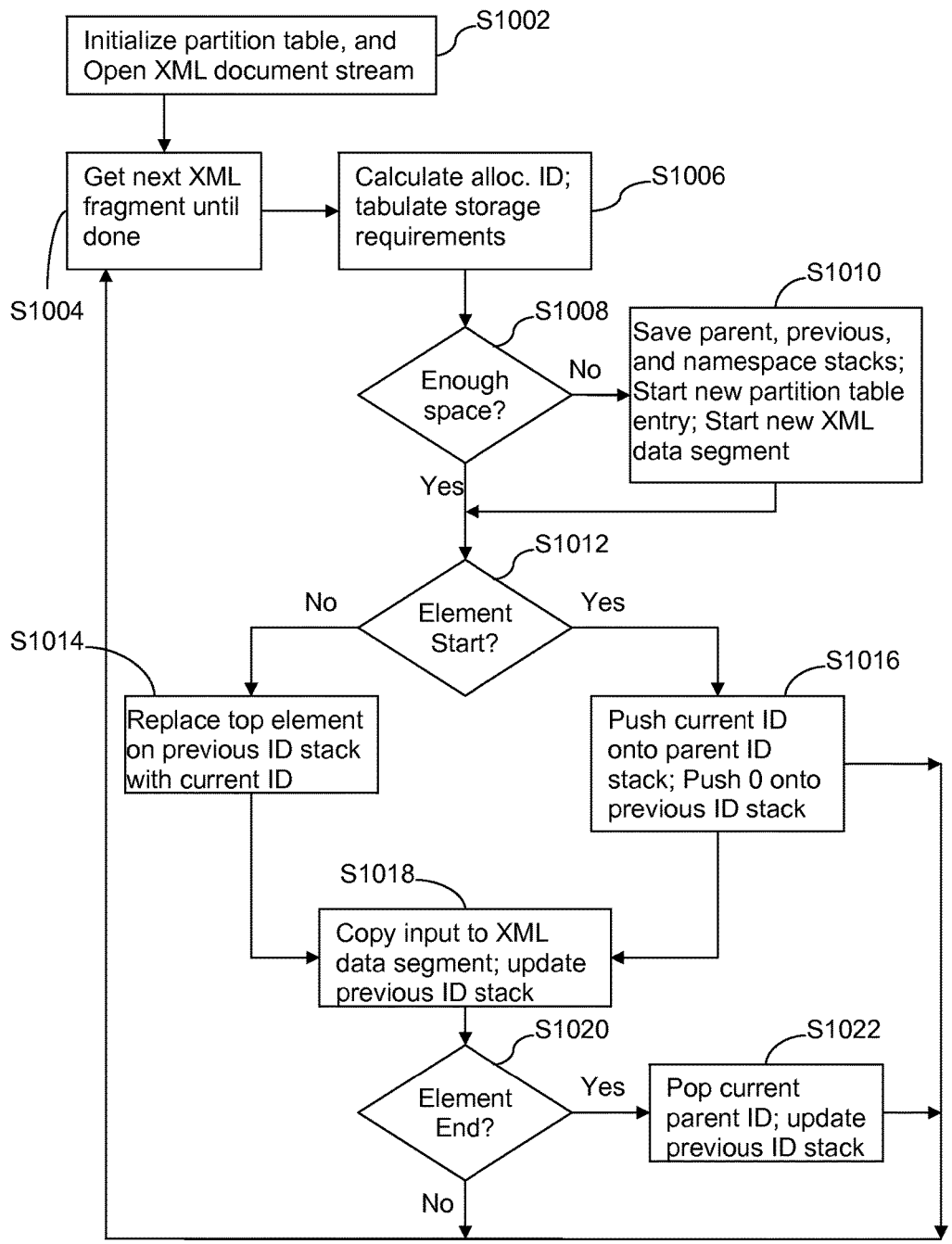
FIGS. 10A and 10B are flowcharts showing an example partition process in accordance with certain example embodiments.

In contrast to the system of FIG. 1, the XML segmenting engine 716 of FIG. 7 operates to, as shown in FIG. 10A, read an XML document stream 704 and to initially create a series of XML data segments 714 that contain raw XML data. In addition to the raw XML text, the engine also records metadata related to each segment including the parent node, previous node, and namespace scope stacks as they exist in the state when pre-parsing of the segment is started.

Figure 10B:
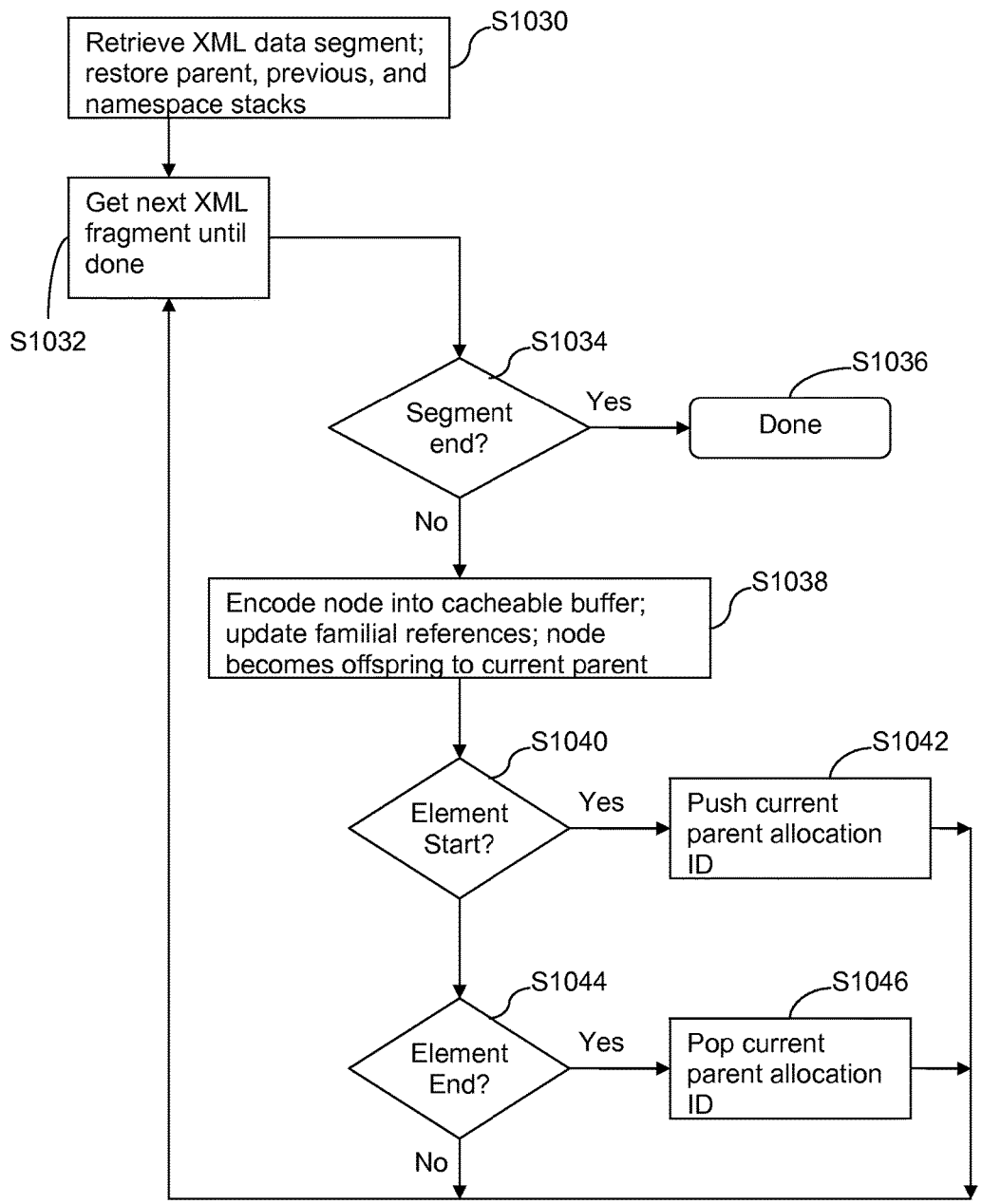

The segments are fully parsed and encoded into cacheable partitions 712 by the partition encoding engine 718, as shown in FIG. 10B, on demand. In certain example embodiments, a cacheable partition is created only when a node therein is referenced for the first time by a user program. When the cacheable partition is created, the backing XML data segment (e.g., in 714) is released and no longer consumes space in parsed data store 706'. The cacheable partitions and related information and/or metadata may be stored in, or in a manner accessible using, a partition table 710.

The parsed data store(s) 706 and/or 706' may include a program and a repository that stores and retrieves the cacheable partitions outside of the user program's memory space (for example, in Java, outside of the memory heap). In embodiments with delayed information set encoding, the parsed data store 706 and/or 706', in addition to storing cacheable partitions (as does the parsed data store 106/106' in the system of FIG. 1) stores XML data segments 714.

As described above in relation to example embodiments with delayed node instantiation, a DOM instantiator creates DOM objects on demand in the system of FIG. 7. The DOM instantiator of the system of FIG. 7 operates similarly to the DOM instantiator of the system of FIG. 1 but, unlike in the system of FIG. 1 where the cacheable partition necessarily exists when it is requested, in certain example embodiments with the delayed information set encoding, the partition is created on demand if it does not already exist.

Figure 8:
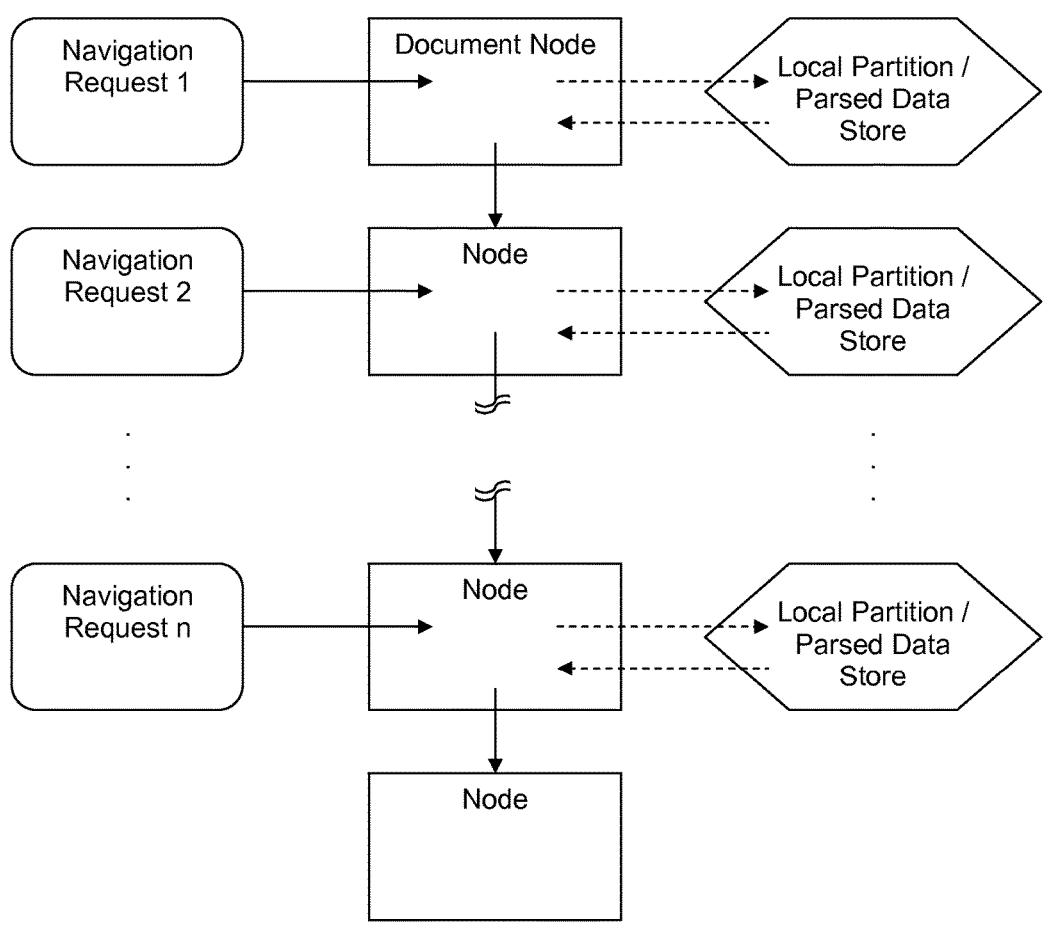
FIG. 8 demonstrates user navigation of a cached document, in accordance with certain example embodiments.

FIG. 8 demonstrates user navigation of a cached document, in accordance with certain example embodiments with delayed information set encoding. As can be seen, navigation requests are processed and used to retrieve nodes from local partition(s) and/or the parsed data store, and from a programmer's point of view, as discussed in relation to FIG. 2 above, externally, the document does not "look" any different from a typical DOM structure. However, there are differences internally, e.g., in the structure of the document and how the tree structure is managed as set forth in greater detail below. As can be seen by comparing FIGS. 2 and 8, the external view of navigating nodes are similar in embodiments with delayed node instantiation (e.g., shown in FIG. 2) and in certain example embodiments with delayed encoding of XML information sets (e.g., as shown in FIG. 8).

Figure 9:
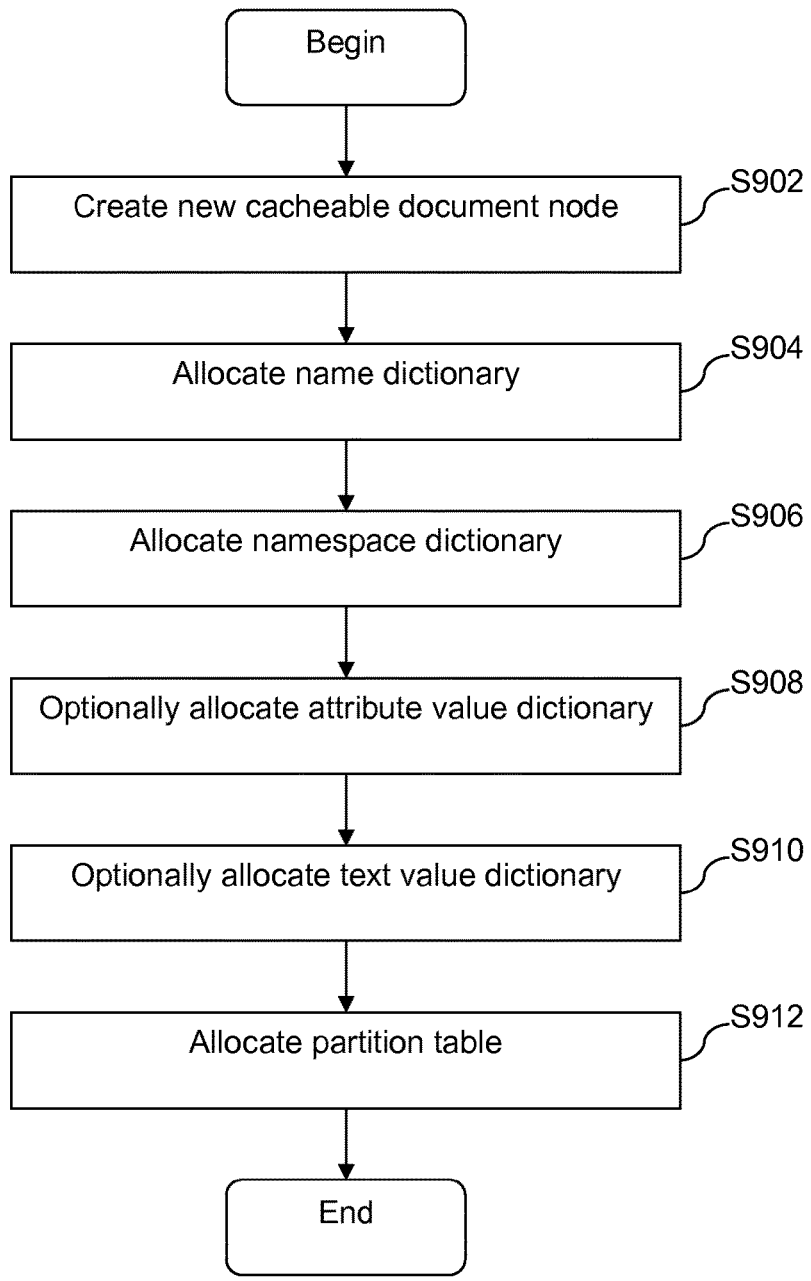
FIG. 9 is a flowchart showing an example initialization process for the partitioning process, in accordance with certain example embodiments.

As indicated above, the XML partitioning engine is configured to receive an XML input stream and/or a parsed data store entry as input. It may, as output, produce encoded XML fragments (that may be stored in the parsed data store) and a DOM cacheable document node (e.g., for a program's memory space). FIG. 9 is a flowchart illustrating a pre-parsing initialization method performed in accordance to some embodiments with delayed XML information set encoding. The example method shown in FIG. 9 may be performed prior to the pre-parsing described below in relation to FIG. 10A. The step (e.g., operations) S902-S912 may be performed in the order shown, in any other order, by combining two or more steps, without one or more steps, or with additional steps.

In certain example embodiments, the processing associated with S902-S910 may be the same as or similar to the corresponding steps S302-S310 described above in relation to FIG. 3. A partition table is allocated in step S912. As alluded to above, the partition table 710 may include a list of cacheable partitions 712 and XML data segments 714. Initially, the partition table may be empty. During the segmenting phase, the entire XML input document is scanned and broken into XML segments that are stored in the partition table. As requests for individual nodes are processed, the XML data segments are converted into cacheable partitions on demand. The partition table may include an allocation array that records the allocation ID of the last encoded node in a partition. This makes it is possible to determine which cacheable partition contains a given node without retrieving the partition if it has already been archived to the parsed data store in certain example embodiments. The partition table also includes, or provides access to, a list of first-link, last-link, and next-link unresolved references.

After the pre-parsing initialization, segmenting of the XML document may be performed as part of the pre-parsing phase. An example segmenting process is illustrated in FIG. 10A. That is, FIG. 10A is a flowchart showing an example segmenting process in accordance with certain example embodiments. As shown in step S1002, the partition table is initialized (e.g., in accordance with the example process described above in connection with FIG. 9), and the XML document stream is opened. The cacheable document node created in step S1002 becomes the current parent node and all subsequently encoded nodes are descendent children of the document node. A streaming XML tokenizer processes an XML document fragment, responding to a sequence of XML parsing events such as the start of an XML element, the declaration of an XML namespace, the presence of an XML attribute, the presence of character data, the presence of a comment, etc.

At S1004, the next XML fragment is obtained until processing of the document is complete. As parsing events are recognized, at step S1006, an allocation ID is computed for each XML token, and the approximate storage requirement is calculated for the encoded form of the token. If the encoded form of the token exceeds the available partition space, as determined at step S1008, a new XML data segment is allocated at S1010 and the current parent and previous stack are copied to the XML data segment.

For an element or element start event recognized at S1012, the current allocation ID is pushed into the parent stack at S1016. A '0' may be pushed onto a previous ID stack. Additionally, any change in XML namespace scope is pushed onto the namespace stack. If the event at S1012 is not an event start, then at S1014, the top element on the previous ID stack is replaced with the current ID.

As each node is processed, its allocation ID replaces the top element on the previous ID stack at S1018. Data from the processed node is copied to the XML data segment. If a node has no previous peer, it may also be recorded as the parent node's first child.

When an end element is processed at S1020, the entry on the top of the previous ID stack becomes the parent node's last child. For an end element, at S1022, the parent ID, previous ID, and namespace scope stacks are popped (the top entry is removed).

Subsequent to the segmenting, partition encoding may be performed. For instance, the partition encoding process shown in FIG. 10B converts an XML data segment into a cached partition and places it in the parsed data store. The partition encoding engine may be used in "greedy" mode where it converts all of the XML data segments into cached partitions as quickly as possible using any available threads to do so. It may also operate in "reluctant" mode where it converts XML data segments on demand in response to requests for specific cacheable partitions that are need to instantiate a DOM node.

At S1030, the XML data segment is retrieved from the parsed data store if necessary. The parent node allocation ID stack, the previous node allocation ID stack, and the namespace declaration stack are restored to the state when the XML Data Segment was created. At step S1032, the next fragments are obtained until the last fragment is done.

If the fragment, as determined at S1034, is a segment end, then at S1036, the partition encoding has completed for the segment. A streaming XML tokenizer processes an XML document fragment, responding to a sequence of XML parsing events such as the start of an XML element, the declaration of an XML namespace, the presence of an XML attribute, the presence of character data, the presence of a comment, etc.

As parsing events are recognized, at S1038, each parsing event is used to encode associated parsed data (e.g., if the event has associated data) into a cacheable partition. The parsing event determines the amount of space that is needed in the current cacheable partition. Because the space allocation was checked during the segmenting phase, it may be known in advance that all items will fit into the current partition.

If the current fragment is an element start, as determined by S1040, the current parent allocation ID is pushed to the corresponding stack at S1042. If the fragment is an end of an element as determined by S1044, the current parent ID is popped at S1046.

When a node is encoded into a partition, its position in the property array is recorded in the locator array so that it is possible to quickly find the position of an encoded node given its allocation ID. Each partition may have the following example structure:

A character array where XML text and XML attribute values are copied;

A properties array where the various properties of the XML event are encoded—this information may include the type of node, the allocation IDs of its parent, sibling, and first and last child nodes, and references to the character array where the event's textual information is stored; and A locator array, which sequentially records the position in the properties array where a node's properties are stored.

In some implementation, the parsed data for each event type may be written as follows:

When an element start tag event is processed, the current position in the properties array is recorded in the location array, and an element code is written to the properties array along with an integer index into the name dictionary.

When an element's namespace declaration is processed, an index is written to the properties array containing a reference to the appropriate namespace dictionary entry.

When an attribute is encountered, an index is written to the properties array containing a reference to the appropriate name dictionary entry. The attribute value is copied to the character array. The location of the attribute value in the character array is copied into the properties array following the attribute name index.

When a text event is received, a text code is written to the properties buffer. The text content is copied to the character array and the position in the character array is saved in the properties array.

When a comment event is received, a comment code is written to the properties array followed by an index into the character array. The comment content is copied into the character array.

An optional throttling mechanism may be used to limit the total amount of program storage that is allocated to the local partition pool. This makes it possible to dampen the effects of an atypically large number of documents arriving during a short interval, without resulting in errors because of insufficient memory, in certain example implementations.

In order to transfer a cacheable document intact to a different session, cacheable partitions in the local partition pool may be archived to the parsed data store. Additionally, the partition table itself, which is not normally archived, may also be committed to the parsed data store in certain example embodiments.

If the archival storage system supports direct access to archived data without full serialization and deserialization (as, for example, possibly in an extension to Terracotta Big Memory), certain example embodiments may curtail the use of the local partition pool in favor of direct access to the archived data.

Figure 11:
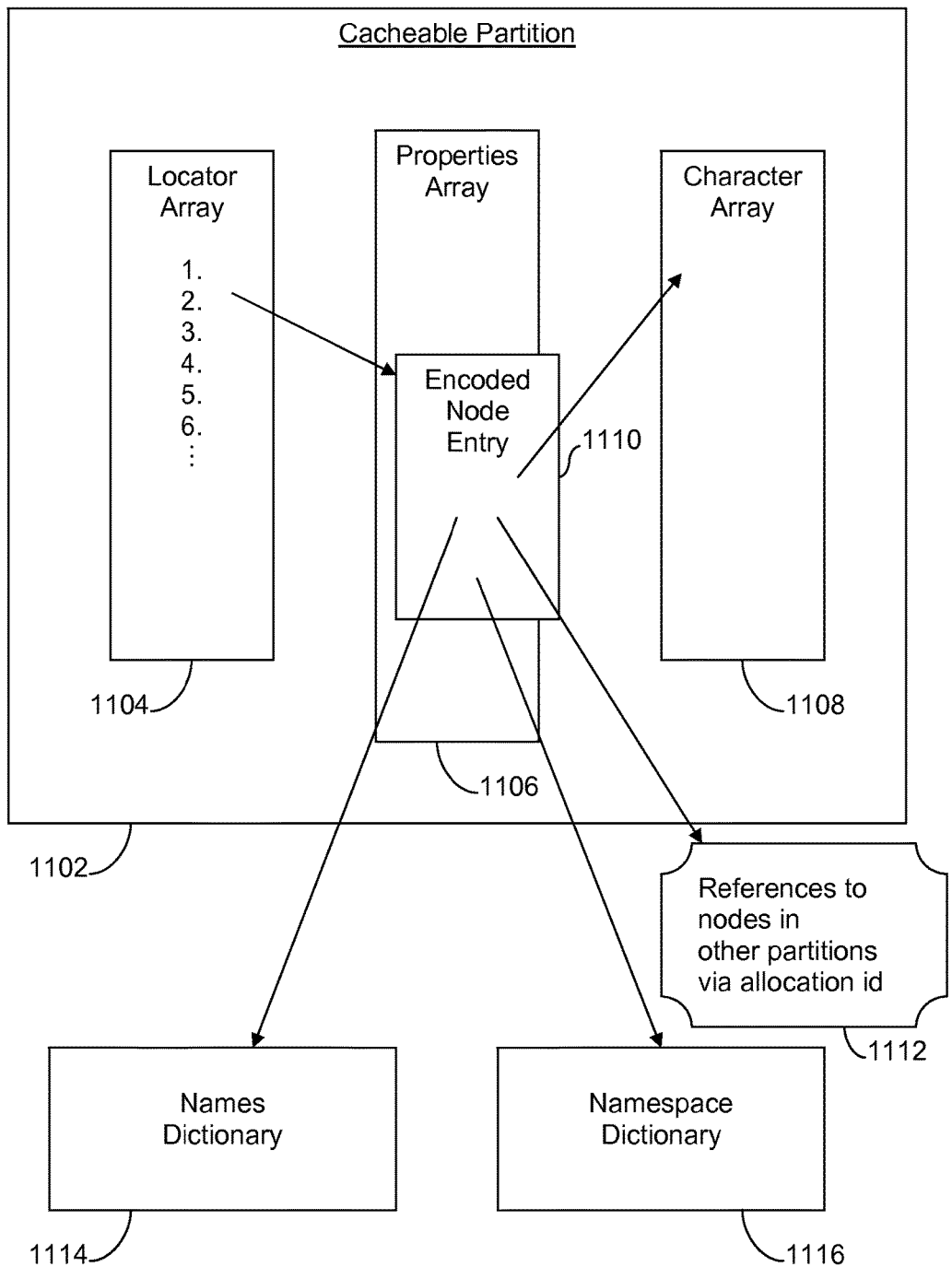
FIG. 11 schematically shows the contents of an example cacheable partition created by a partitioning engine in accordance with certain example embodiments.

FIG. 11 schematically shows the contents of an example cacheable partition created by a partitioning engine in accordance with certain example embodiments and, thus, shows an example encoding for the nodes. The cacheable partition 1102 includes a locator array 1104, a properties array 1106, and a character array 1108. The locator array 1104 indicates that certain example embodiments involve locator information being stored in each partition (e.g., as opposed to retaining a single completely memory-resident index). Plural encoded node entries may be present in the properties array 1106. The example encoded node entry 1110 may include a variety of data and/or linkages to data. For example, nodes may have an entry for DOM node type. Additionally, there may be references 1112 (e.g., allocation IDs) for parent, previous sibling, and next sibling entries. By comparing FIG. 11 with FIG. 5, it can be seen that the structure of cacheable partitions is similar in certain example embodiments with delayed node instantiation and certain example embodiments with delayed information set encoding.

Figure 12:
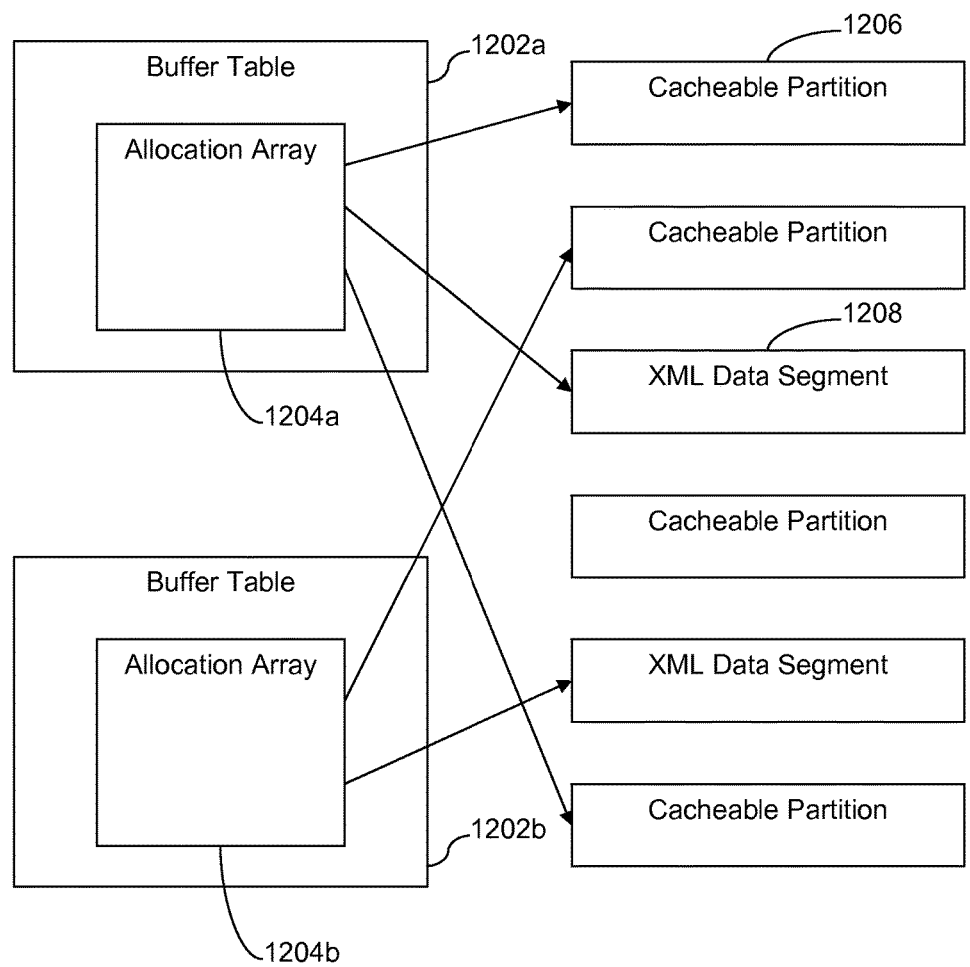
FIG. 12 schematically shows partition tables organizing collections of cacheable partitions for cacheable documents in the parsed data store in accordance with certain example embodiments.

FIG. 12 illustrates that partition table(s) 1202a and 1202b may include allocation arrays 1204a and 1204b that may include entries for cacheable partitions 1206 and XML data segments 1208. In certain example embodiments with delayed encoding of XML information sets, partition tables may be referred to as buffer tables because, in addition to cacheable partitions, they include XML data segments.

All instantiated DOM nodes reference familial nodes (e.g., parent node, sibling node, or child node) using the familial node's allocation ID in certain example embodiments. The DOM instantiator finds the referenced node in one of the cacheable partitions by searching the allocation array. After locating the appropriate cacheable partition, the allocation ID is used as an offset into the partition's locator array to determine the position of the encoded node information in the properties array. The information is then used to construct a DOM node and the node (or a reference to the node) is returned to the requesting program.

When a DOM navigation request is performed for a familial link that is not initialized, the link is found in the appropriate link table: first-link, last-link, or next-link.

Because DOM nodes contain no address references to other DOM nodes in certain example embodiments, the nodes are eligible for deallocation (e.g., garbage collection) when they are no longer in use. In DOM trees of conventional systems, retaining a reference to any node in the tree retains the entire tree.

The parsed data store may be an off-program-memory bag that is used to archive cacheable partitions and XML data segments in certain example implementations. The parsed data store does not occupy storage in the user program's space and thus makes it possible for a user program to access an arbitrarily large XML document, constrained only by the amount of storage accessible to the parsed data store, in such example implementations.

It will be appreciated that the overall structure of the parsed data store, according to certain example embodiments with delayed information set encoding, may be as shown in FIG. 11. According to certain example embodiments, Terracotta Big Memory caching may be utilized to store the cacheable partitions in off-heap memory.

An explicit update mode for cached documents may not be necessary because cached documents are implicitly updatable via the DOM API. Updating an existing encoded node may be achieved by encoding a replacement node with the new information and then changing any other nodes' references for the existing node to the newly encoded node.

From a user's perspective, instead of being driven by parsing events, the node creation methods in the DOM API directly call the node encoding program to append new encodings to the cached partitions. These appended encodings may be physically adjacent, but their logical position may be anywhere in the document, thus fully supporting the notion of inserting new child nodes or removing existing child nodes at any point in the tree.

In certain example embodiments, by default, text and attribute values may be copied "as is" into each cacheable partition's character array. However, there are situations when there is a great deal of repeated data and therefore it may be beneficial optionally to enable dictionaries for text and attribute values. Such dictionaries may be beneficial when, for example, the added overhead of performing a uniqueness check is less than the overhead of copying and caching large amounts of duplicate data, especially when the number of unique alternatives is relatively small.

Optional use of dedicated partitions, local partition throttling, and tuning aspects of the system may be performed in embodiments with delayed information set encoding. Such use may be made in manners similar or identical to how such features are used with respect to the embodiments with delayed node instantiation.

When the user program no longer contains references to the document node or any of its child nodes, the archived buffers in the parsed data store may be released.

Inter-process sharing of a cacheable document may be facilitated in embodiments with delayed information set encoding in a similar manner to that described above in relation to embodiments with delayed node instantiation.

Although certain example embodiments have been described as being implemented with a stack, it will be appreciated that other data structures may be used instead of, or in addition to, a stack. For instance, as is known, a queue may be used to provide the same or similar functionality as a stack.

In view of the foregoing, it will be appreciated that certain example embodiments provide a system for processing XML documents comprising processing resources including at least one processor and a memory. The processing resources are configured to perform operations comprising pre-parsing an XML document to generate a plurality of XML segments and metadata for each generated XML segment, with the XML document including a plurality of objects representable in accordance with an object model. In response to a request received for an object from a user program, the processing resources are further configured to at least: identify at least one of the generated XML segments having the requested object; parse the identified at least one XML segment into one or more constituent nodes; and instantiate said requested object using the one or more constituent nodes in accordance with the object model.

According to certain example embodiments, parsing the identified at least one XML segment may comprise parsing only the identified at least one XML segment in response to the request.

According to certain example embodiments, identifying at least one of the generated XML segments may comprise identifying the at least one of the generated XML segments using the generated metadata.

According to certain example embodiments, pre-parsing an XML document may comprise dividing the XML document into the plurality of XML segments, and each XML segment may include raw XML source code. Furthermore, according to certain example embodiments, pre-parsing an XML document may further comprise: for each XML segment from the plurality of the XML segments, determining a range of node identifiers representing nodes included in the XML segment; and storing an indication of the determined range in the metadata associated with the XML segment. Alternatively, or in addition, pre-parsing an XML document may further comprise: for each XML segment from the plurality of the XML segments, determining a state before beginning the pre-parsing of the XML segment; and storing the determined state as at least part of the metadata associated with the XML segment.

According to certain example embodiments, the generated XML segments may be stored in one or more partitions. Furthermore, in certain example embodiments and in response to the request, the one or more constituent nodes may be stored in the partition having the associated generated XML segment. Optionally, each said partition may include a locator array, a properties array, and a character array, wherein the locator array is configured to identify starting positions of nodes encoded in the properties array, and the properties array is configured to store encoded nodes, as well as, for each said encoded node: metadata including a respective node type, reference(s) to any familial nodes thereof (e.g., an allocation identifier), and offset(s) into the character array for any attribute and/or text value(s) associated therewith.

According to certain example embodiments, the XML document may be pre-parsed by executing a pre-parsing initialization that includes: creating a cacheable document node that corresponds to the starting point for user program access to the XML document; allocating a name dictionary that includes an indexed entry for each unique XML tag name included in the XML document; allocating a namespace dictionary that includes an index entry for each unique XML namespace included in the XML document; and allocating a partition table that includes a list of cacheable partitions, XML segments, and an allocation array that allows a node's allocation identifier to be resolved to a specific cacheable partition, with each said cacheable partition including metadata from the pre-parsing initialization. Optionally, the pre-parsing initialization may further include allocating an attribute value dictionary that stores unique occurrences of attribute values included in the XML document, and/or a text value dictionary that stores unique occurrences of text values included in the XML document.

According to certain example embodiments, parsing the identified at least one XML segment may comprise: recognizing parsing events of predefined parsing event types within the XML segment; creating nodes for the recognized parsing events; adding the created nodes to a current partition while there is sufficient space therein; and creating a new partition when there is insufficient space in the current partition for adding created nodes, updating the partition table, and continuing with the adding by treating the newly created partition as the current partition. Optionally, the partitions and the partition table may be movable from the memory to the non-transitory computer readable storage medium when moving the XML document from session to session.

Corresponding methods and/or non-transitory computer readable storage media having instructions stored thereon that, when executed by a computer, cause the computer to perform operations corresponding to such methods, additionally or alternatively may be provided in different example embodiments.

A description of certain terms is provided below for aiding in the understanding of how certain example embodiments may operate. However, it is to be understood that the following descriptions are provided by way of example for explanatory purposes and should not be construed as being limiting on the claims, unless expressly noted.

| Term | Example Description |
| --- | --- |
| Allocation Array | A potentially linear list maintained in the partition table. For each cacheable partition in the partition table, a corresponding entry in the allocation array may specify the allocation identifier of the last encoded node in the partition. This makes it possible, given a node's allocation identifier, to determine the cacheable partition in which a node resides, e.g., by performing a simple linear, binary, or other search of the allocation array. Given a cacheable partition, the exact location of an encoded node in the partition can be calculated by using the node's allocation identifier as a relative offset into the partition's locator array. |
| Allocation Identifier | When a parsed XML fragment is encoded into a cacheable partition, the corresponding encoded node may be assigned an allocation identifier. The allocation identifier may preserve the order in which nodes are created. One simple order-preserving allocation identifier that may be used in connection with certain example embodiments is a simple integer counter that is incremented every time a new node is encoded into a cacheable partition. The allocation identifier may be unique within a cacheable document and may be unique for the life of the cached document. Each DOM entity (e.g., element, text, etc.) may be assigned an allocation identifier that allows it to be located within the cached document. As alluded to above, it may be an integer value and assigned in ascending order as XML entities are encountered during parsing. |
| Terracotta BIGMEMORY ® | A feature that allows large (and possibly serializable) objects to be stored in an off-heap memory cache. The use of Terracotta's BIGMEMORY ® feature may be used in connection with the parsed data store of certain example embodiments. |

-continued

| Term | Example Description |
|---|---|
| Cacheable Document | A composite object that includes a DOM document node implementation along with a partition table and associated cacheable partitions. Any DOM object may be navigated to and retrieved from the cached document. A cacheable document may be created by invoking the XML partitioning engine, passing it an XML document stream and/or a parsed data store implementation. |
| Cacheable Partition | A composite object that includes structured information about a segment of an XML document that has been pre-parsed. In certain example embodiments, a cacheable partition may include a character array, a properties array, and a locator array. A cacheable partition may be present in an on-heap local partition pool, and/or it may have been serialized and archived to the parsed data store. |
| Character Array | A component part of a cacheable partition, in certain example embodiments, that is available for storing character data. The values of XML text, CData entities, and XML attribute values may be saved in the Character Array. |
| Dictionary | A potentially memory-resident storage mechanism that ensures only a single copy of a value is saved. Multiple encoded nodes can refer to the same dictionary entry, thereby reducing memory usage. Element names, attribute names, namespace URIs, and/or the like, may be stored in dictionaries in certain example implementations, thereby potentially reducing the size of encoded nodes. Attribute values and text values may optionally be stored in dictionaries. |
| Direct Parsed Data Access | A technique in which the use of the local partition pool is reduced in favor of direct access to the caching store. This approach may be desirable when, for example, access to the caching store is possible without serialization and deserialization overhead. |
| Document Node | A node created by the parsing process. DOM parsers may produce a document node from which other members of a DOM tree are retrieved through navigation. The document node created by the XML partitioning engine may also include a names dictionary, a namespace dictionary, and a reference to a partition table. |
| DOM Instantiator | Hardware and/or program code that takes an allocation identifier reference to an encoded DOM node in a cacheable partition and instantiates (creates) a fully functioning DOM node. |
| Encoded Node Entry | Information in a cacheable partition that allows the corresponding DOM node to be constructed on demand. Every encoded node entry in a cacheable partition may be assigned a unique allocation identifier that is used for subsequent retrieval of the encoded node. |
| Familial Relationship | Each node in a DOM tree may have a parent node, a previous sibling, and a next sibling. Additionally, an element node may have a first child and a last child. When nodes are encoded in the properties array, the references to these familial nodes may be recorded as allocation identifiers rather than physical memory references. |
| Inter-Node Reference | A reference using a node's allocation identifier. Encoded DOM nodes may represent familial references (e.g., parent, sibling, and/or child references) using allocation identifiers. In order to construct the DOM node given its allocation identifier, an index maintained by the partition table may determine which cacheable partition includes the encode node. This may be achieved without fetching any archived buffers in certain example embodiments. Having identified the cacheable partition containing the node, the allocation identifier may be used as an offset into the locator array to determine the starting position of the encoded node's definition in the properties array. The values in the properties may be indices into the character array, or into the names or namespace tables, and may allow the full construction of the requested node. |
| Local Partition Pool | A pool of cacheable partitions that has not been archived to the parsed data store and, thus, may be immediately usable. It is possible and potentially likely that many XML documents may not require any serialization and can reside entirely in the local partition pool. |
| Local Partition Pool Throttling | A technique that maintains total memory allocation for the local partition pool below some threshold. If the threshold is exceeded, additional document parsing may be delayed until the allocation drops below the threshold. |
| Locator Array | A component part of a cacheable partition, in certain example embodiments. It may be a linear list, e.g., of integers, that identifies the starting position of an encoded node in the properties array and thus may represent a list of the encoded nodes in the order that they were created. |
| Parsed Data Store | A non-program-memory storage mechanism (e.g., off-heap memory in Java-based environments) where cacheable partitions and XML segments can be archived for subsequent retrieval and use. One possible embodiment of such off-heap storage is a Terracotta BIGMEMORY ® instance, which may be multi-tiered and include non-heap local memory (Terracotta BIGMEMORY ®), as well as traditional disk-based (and potentially shared) caches. |
| Partition Table | A collection of cacheable partitions that includes the metadata from the pre-parsing of an XML document stream. It also may include an allocation array that allows a node's allocation identifier to be resolved to a specific cacheable partition. It may be created by the XML partitioning engine. |

-continued

| Term | Example Description |
| --- | --- |
| Properties Array | A component part of a cacheable partition that is an array of integer or other values, in certain example embodiments. The information that defines an encoded DOM node may be represented as a series of integer or other values somewhere within the properties array, potentially adjacent to other DOM node encodings. The integer values may encode the node type, references to familial nodes (e.g., parents, siblings, and/or children) using allocation identifiers, and offsets into the character array for attribute and text values. |
| XML Document Stream | A stream of characters that comprises a well-formed XML document. |
| XML Partitioning Engine | Hardware and/or a software program that pre-parses an XML document steam into fragments and creates a cacheable document including, for example, a partition table and one or more cacheable partitions. The pre-parsed fragments may be stored in cacheable partitions and/or in dictionaries. |

Although certain example embodiments have been described in connection with XML documents and the Document Object Model, it will be appreciated that the example techniques described herein may be used in connection with other document and/or model types.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of processing an XML document, comprising:
   pre-parsing, using at least one processor, an XML document to generate a plurality of XML segments and metadata for each generated XML segment, the XML document including a plurality of objects representable in accordance with an object model, wherein pre-parsing the XML document includes dividing the entire XML document into the plurality of generated XML segments, with each generated XML segment including a portion of raw XML source code of the XML document and a plurality of nodes, and the metadata for the respective generated XML segment identifying a range of node identifiers representing the plurality of nodes in the raw XML source code of the respective generated XML segment;
   storing the generated XML segments and the metadata in a data store;
   receiving a request for an object from a user program; and
   in response to the request received for the object from the user program:
   identifying, based on the generated metadata, at least one of the generated XML segments, stored in the data store, having the requested object;
   parsing the identified at least one XML segment into one or more constituent nodes;
   encoding the identified at least one XML segment into one or more cacheable partitions, each said cacheable partition including a locator array, a properties array, and a character array, wherein the properties array is configured to store a plurality of encoded nodes, as well as, for each said encoded node: (1) metadata including a respective node type, (2) reference(s) to any familial nodes thereof, and (3) offset(s) into the character array for any attribute or text value(s) associated therewith, wherein the locator array identifies starting positions of nodes encoded in the properties array;
   storing the one or more cacheable partitions in the data store;
   after the identified at least one XML segment is encoded into the one or more cacheable partitions, releasing the identified at least one XML segment from the data store storing the generated XML segments without releasing the other XML segments stored in the data store until they are encoded into one or more cacheable partitions; and
   instantiating said requested object using the one or more cacheable partitions and the one or more constituent nodes in accordance with the object model, wherein the data store is a repository storing data outside of the user program's memory space.

2. A non-transitory computer readable storage medium having instructions stored thereon that, when executed by a computer, cause the computer to perform operations comprising:
   pre-parsing an XML document to generate a plurality of XML segments and metadata for each generated XML segment, the XML document including a plurality of objects representable in accordance with an object model, wherein pre-parsing the XML document includes dividing the entire XML document into the plurality of generated XML segments, with each generated XML segment including a portion of raw XML source code of the XML document and a plurality of nodes, and the metadata for the respective generated XML segment identifying a range of node identifiers representing the plurality of nodes in the raw XML source code of the respective generated XML segment;

storing the generated XML segments and the metadata in a data store; and in response to a request received for an object from a user program:
 identifying, based on the generated metadata, at least one of the generated XML segments, stored in the data store, having the requested object;
 parsing the identified at least one XML segment into one or more constituent nodes;
 encoding the identified at least one XML segment into one or more cacheable partitions, each said cacheable partition including a locator array, a properties array, and a character array, wherein the properties array is configured to store a plurality of encoded nodes, as well as, for each said encoded node: (1) metadata including a respective node type, (2) reference(s) to any familial nodes thereof, and (3) offset(s) into the character array for any attribute or text value(s) associated therewith, wherein the locator array identifies starting positions of nodes encoded in the properties array;
 storing the one or more cacheable partitions in the data store;
 after the identified at least one XML segment is encoded into the one or more cacheable partitions, releasing the identified at least one XML segment from the data store storing the generated XML segments without releasing the other XML segments stored in the data store until they are encoded into one or more cacheable partitions; and
 instantiating said requested object using the one or more cacheable partitions and the one or more constituent nodes in accordance with the object model, wherein the data store is a repository storing data outside of the user program's memory space.

3. A system for processing XML, documents, comprising processing resources including at least one processor and a memory,
wherein the processing resources are configured to perform operations comprising:
 pre-parsing an XML document to generate a plurality of XML segments and metadata for each generated XML segment, the XML document including a plurality of objects representable in accordance with an object model, wherein pre-parsing the XML document includes dividing the entire XML document into the plurality of generated XML segments, with each generated XML segment including a portion of raw XML source code of the XML document and a plurality of nodes, and the metadata for the respective generated XML segment identifying a range of node identifiers representing the plurality of nodes in the raw XML source code of the respective generated XML segment;
 storing the generated XML segments and the metadata in a data store; and
 in response to a request received for an object from a user program:
  identifying, based on the generated metadata, at least one of the generated XML segments, stored in the data store, having the requested object;
  parsing the identified at least one XML segment into one or more constituent nodes;
  encoding the identified at least one XML segment into one or more cacheable partitions, each said cacheable partition including a locator array, a properties array, and a character array, wherein the properties array is configured to store a plurality of encoded nodes, as well as, for each said encoded node: (1) metadata including a respective node type, (2) reference(s) to any familial nodes thereof, and (3) offset(s) into the character array for any attribute or text value(s) associated therewith, wherein the locator array identifies starting positions of nodes encoded in the properties array;
  storing the one or more cacheable partitions in the data store;
  after the identified at least one XML segment is encoded into the one or more cacheable partitions, releasing the identified at least one XML segment from the data store storing the generated XML segments without releasing the other XML segments stored in the data store until they are encoded into one or more cacheable partitions; and
  instantiating said requested object using the one or more cacheable partitions and the one or more constituent nodes in accordance with the object model, wherein the data store is a repository storing data outside of the user program's memory space.

4. The system of claim 3, wherein parsing the identified at least one XML segment comprises parsing only the identified at least one XML segment in response to the request.

5. The system of claim 3, wherein instantiating said requested object comprises instantiating only said requested object in response to the request.

6. The system of claim 3, wherein pre-parsing an XML document further comprises:
 for each generated XML segment from the plurality of the XML segments, generating a stack of XML namespace prefixes as the XML namespace prefixes exist in the XML document when pre-parsing of the segment is started; and
 storing the stack of XML namespace prefixes in the metadata associated with the generated XML segment.

7. The system of claim 3, wherein pre-parsing an XML document further comprises:
 for each generated XML segment from the plurality of the XML segments, determining a state before beginning the pre-parsing of the XML document; and
 storing the determined state as at least part of the metadata associated with the generated XML segment.

8. The system of claim 3, wherein the processing resources are further configured to, in response to the request, store the one or more constituent nodes in the cacheable partition having the associated generated XML segment.

9. The system of claim 3, wherein each said reference is an allocation identifier.

10. The system of claim 3, wherein the processing resources are further configured to remove partitions of the parsed document from the memory or a non-transitory computer readable storage medium when the user program no longer includes any references to the document or any objects thereof.

11. The system of claim 3, wherein the XML document is pre-parsed by executing a pre-parsing initialization that includes:

creating a cacheable document node that corresponds to the starting point for user program access to the XML document;

allocating a name dictionary that includes an indexed entry for each unique XML tag name included in the XML document;

allocating a namespace dictionary that includes an index entry for each unique XML namespace included in the XML document; and allocating a partition table that includes a list of cacheable partitions, XML segments, and an allocation array that allows a node's allocation identifier to be resolved to a specific cacheable partition, each said cacheable partition including metadata from the pre-parsing initialization.

12. The system of claim 11, wherein the pre-parsing initialization further includes allocating an attribute value dictionary that stores unique occurrences of attribute values included in the XML document, or a text value dictionary that stores unique occurrences of text values included in the XML document.

13. The system of claim 3, wherein said parsing the identified at least one XML segment comprises:

recognizing parsing events of predefined parsing event types within the XML segment;

creating nodes for the recognized parsing events;

adding the created nodes to a current partition while there is sufficient space therein; and creating a new partition when there is insufficient space in the current partition for adding created nodes, updating the partition table, and continuing with the adding by treating the newly created partition as the current partition.

14. The system according to claim 13, wherein the partitions and the partition table are movable from the memory to a non-transitory computer readable storage medium when moving the XML document from session to session.

15. The system of claim 3, wherein the processing resources are further configured to:

receive an update request to a node in the identified at least one XML segment;

in response to the update request, encode a replacement node with new information requested in the update request into one of the cacheable partitions; and replace references to an encoded node corresponding to the node for which the update is received with a reference to encoded replacement node.

* * * * *